US007813387B2

(12) United States Patent
Pedersen et al.

(10) Patent No.: US 7,813,387 B2
(45) Date of Patent: Oct. 12, 2010

(54) OPTICAL SYSTEM FOR PROVIDING SHORT LASER-PULSES

(75) Inventors: Claus Friis Pedersen, Bronshoj (DK); Peter M. W. Skovgaard, Birkerod (DK)

(73) Assignee: NKT Photonics A/S, Birkerod (DK)

( * ) Notice: Subject to any disclaimer, the term of this patent is extended or adjusted under 35 U.S.C. 154(b) by 369 days.

(21) Appl. No.: 11/277,252

(22) Filed: Mar. 23, 2006

(65) Prior Publication Data

US 2006/0209908 A1 Sep. 21, 2006

Related U.S. Application Data

(63) Continuation-in-part of application No. PCT/EP2004/052655, filed on Oct. 25, 2004.

(60) Provisional application No. 60/513,545, filed on Oct. 24, 2003.

(51) Int. Cl.
*H01S 3/11* (2006.01)
(52) U.S. Cl. .......................... 372/10; 372/25
(58) Field of Classification Search ............... 372/10, 372/25
See application file for complete search history.

(56) References Cited

U.S. PATENT DOCUMENTS

| 5,050,183 | A  * | 9/1991  | Duling, III ............... 372/94 |
| 5,696,782 | A    | 12/1997 | Harter et al. |
| 6,324,326 | B1 * | 11/2001 | Dejneka et al. ............ 385/123 |
| 6,496,634 | B1   | 12/2002 | Levenson |
| 6,570,892 | B1 * | 5/2003  | Lin et al. ................ 372/6 |
| 6,735,234 | B1   | 5/2004  | Paschotta et al. |
| 6,826,342 | B1 * | 11/2004 | Bise et al. ............... 385/125 |
| 6,885,683 | B1 * | 4/2005  | Fermann et al. ........... 372/25 |

(Continued)

FOREIGN PATENT DOCUMENTS

WO 0159895 A1 8/2001

(Continued)

OTHER PUBLICATIONS

Zheltikov, A. M., "Holey Fibers", 2000, Russian Academy of Sciences, Uspekhi Fizicheskikh Nauk, 170 (11), 1203-1215.*

(Continued)

*Primary Examiner*—Minsun Harvey
*Assistant Examiner*—Joshua King
(74) *Attorney, Agent, or Firm*—Buchanan Ingersoll & Rooney PC

(57) ABSTRACT

The present invention deals with optical systems for providing short laser pulses. An object of the invention is to provide an optical system providing compact and cost-effective short laser-pulses using fibers with anomalous dispersion and high non-linear thresholds. The object is achieved by a short pulse optical system for generating or processing short laser-pulses, said optical system comprises an optical fiber in the form of a photonic crystal fiber arranged to provide guidance of light in the core region due to the photonic bandgap effect (PBG), where light propagates in a hollow or solid core surrounded by a Silica cladding comprising a substantially periodic distribution of micro-structural elements, and where the refractive index of the core is lower than the effective refractive index of the cladding. The invention may be useful in applications such as laser-based micromachining, thin-film formation, laser cleaning, in medicine and biology.

28 Claims, 17 Drawing Sheets

U.S. PATENT DOCUMENTS

| | | | |
|---|---|---|---|
| 2002/0061176 A1* | 5/2002 | Libori et al. | 385/125 |
| 2002/0168161 A1* | 11/2002 | Price et al. | 385/123 |
| 2003/0016922 A1* | 1/2003 | DeMartino et al. | 385/98 |
| 2003/0156605 A1 | 8/2003 | Richardson et al. | |
| 2004/0263950 A1* | 12/2004 | Fermann et al. | 359/333 |

FOREIGN PATENT DOCUMENTS

| | | |
|---|---|---|
| WO | 03079077 A1 | 9/2003 |

OTHER PUBLICATIONS

Limpert et al., "High-power air-clad large mode-area photonic crystal fiber laser", Apr. 7, 2003, Optical Society of America, Optics Express, 11 (7), 818-823.*

Fan et al., "105-kW Peak-Power Double-Clad Fiber Laser", May 5, 2003, IEEE, Photonics Technology Letters, 15 (5), 652-654.*

Limpert et al., "All fiber chirped-pulse amplification system based on compression in air-guiding photonic bandgap fiber", Dec. 1, 2003, Optical Society of America, Optics Express, 11(24), 3332-3337.*

De Matos et al, "All-fiber chirped pulse amplification using highly-dispersive air-core photonic bandgap fiber", Nov. 3, 2003, Optical Society of America, Optics Express, 11 (22), 2832-2837.*

Broderick et al., "Power Scaling in Passively Mode-Locked Large-Mode Area Fiber Lasers", Dec. 12, 1998, IEEE, Photonics Technology Letters, 10 (12), 1718-1720.*

Limpert et al., "High-average-power femtosecond fiber chirped-pulse amplification system", Oct. 15, 2003, Optical Society of America, Optics Letters, 28 (20), 1984-1986.*

International Search Report from WO 2005/041367.

C.J.S. De Matos et al., Short-Pulse, All-Fiber, Raman Laser With Dispersion Compensation in a Holey Fiber, Optics Letters, Oct. 15, 2003, pp. 1891-1893, vol. 28, No. 20, XP002313456.

Dimitre G. Ouzounov et al., Generation of Megawatt Optical Solitons in Hollow-Core Photonic Band-Gap Fibers, Science, American Association for the Advancement of Science, Sep. 19, 2003, pp. 1702-1704, vol. 301, XP002291312.

P.J. Bennet et al., Toward Practical Holey Fiber Technology: Fabrication, Splicing, Modeling, and Characterization, Optics Letters, Sep. 1, 1999, pp. 1203-1205, vol. 24, No. 17, XP000944426.

R.K. Sinha et al., Estimation of Splice Loss in Photonic Crystal Fibers, SPIE-INT, Jan. 23, 2002, pp. 296-302, vol. 4655, XP002313457.

H. Lim et al., Femtosecond Ytterbium Fiber Laser With Photonic Crystal Fiber for Dispersion Control, Optics Express, Dec. 16, 2002, pp. 1497-1502, vol. 10, No. 25.

* cited by examiner

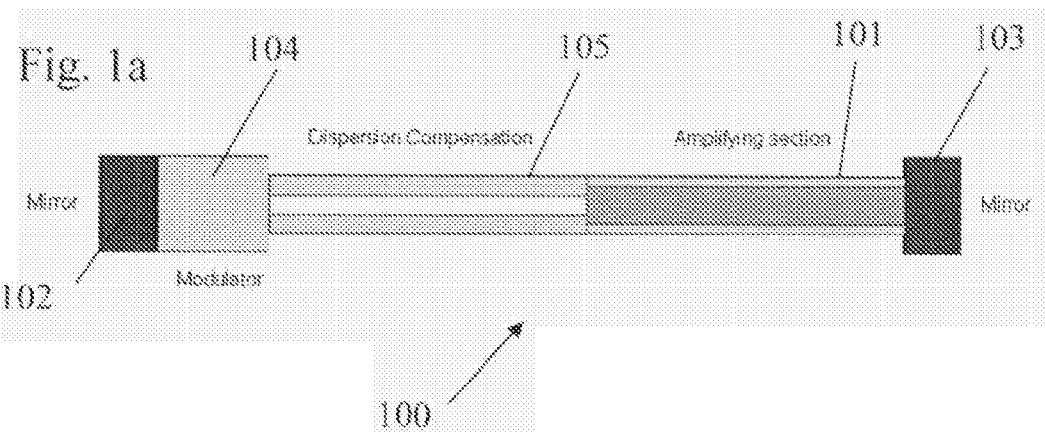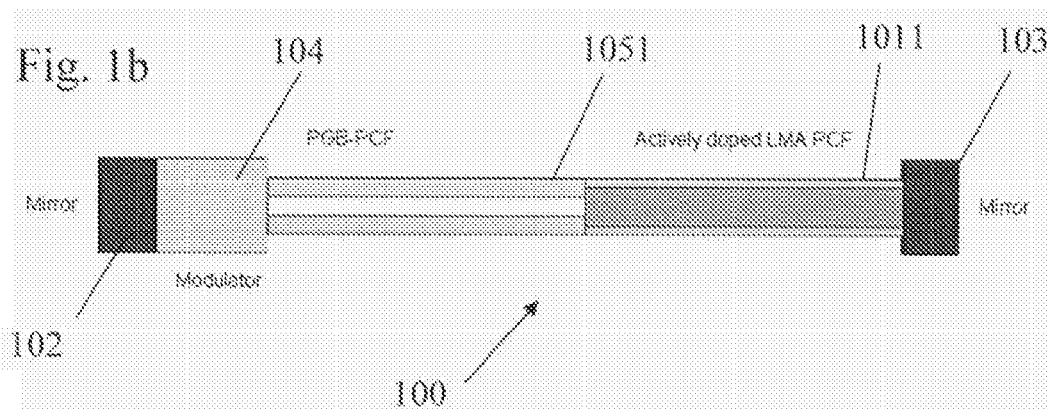

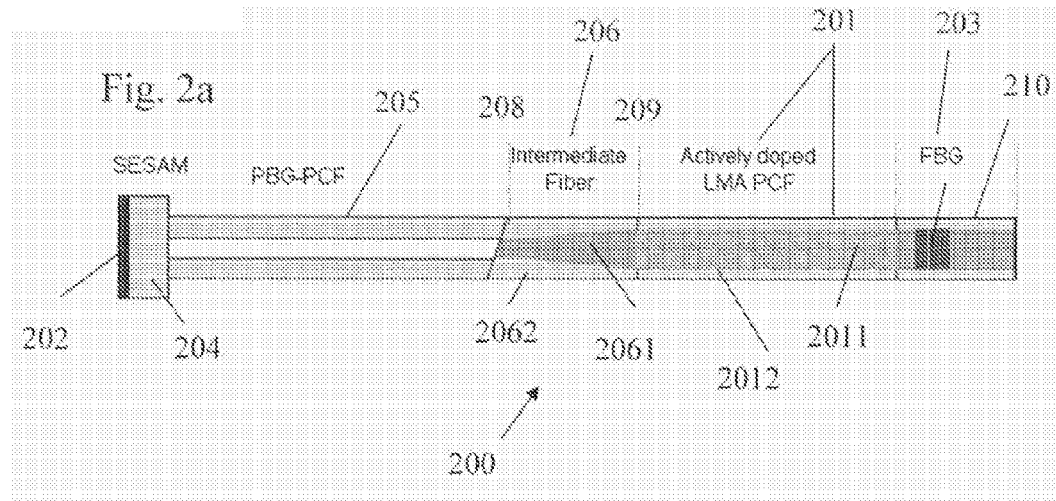
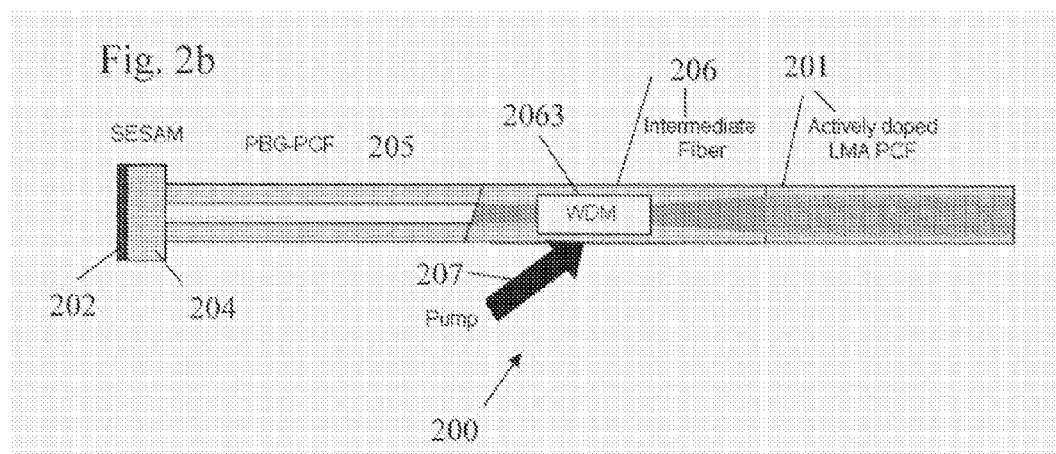

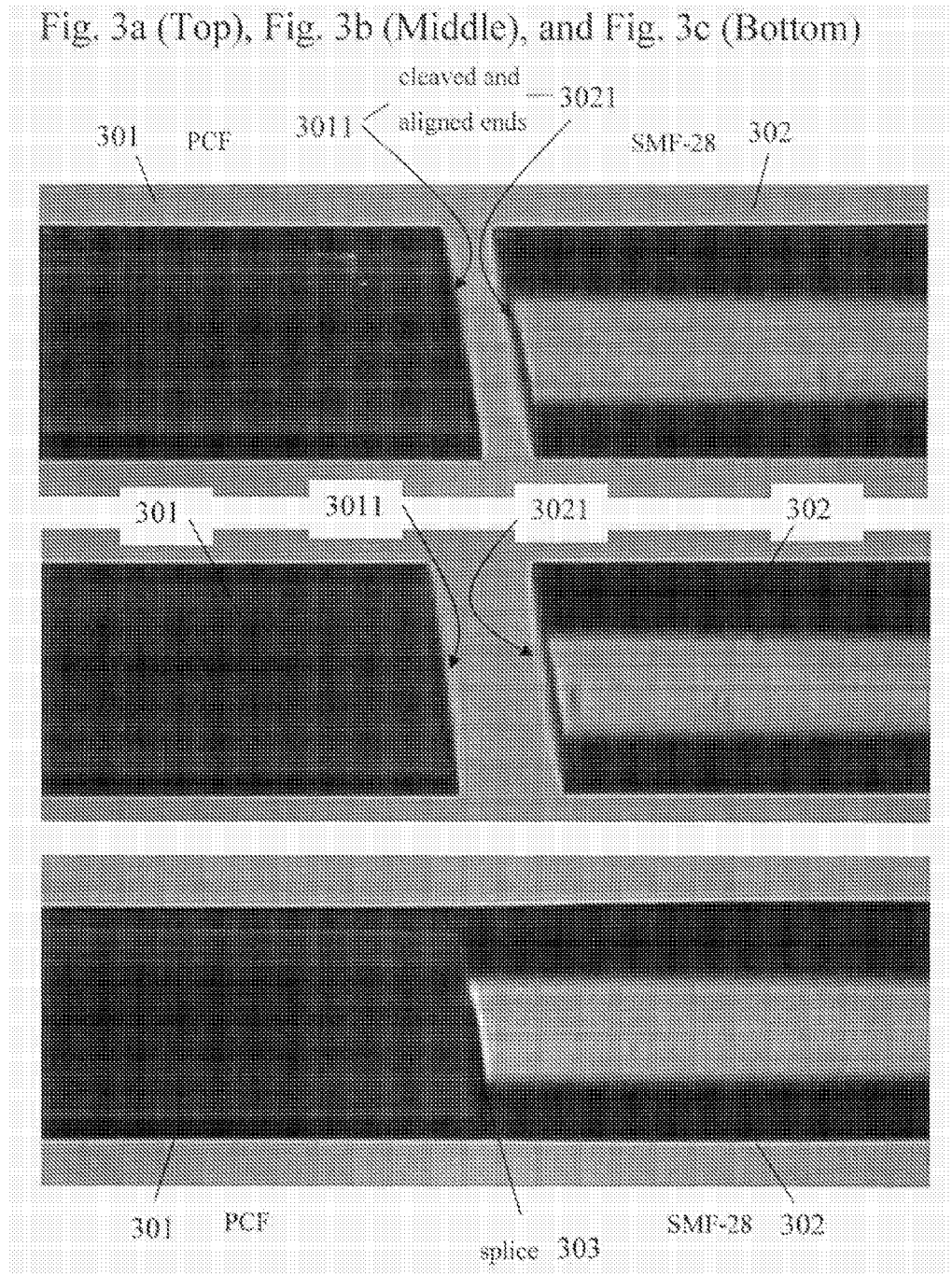

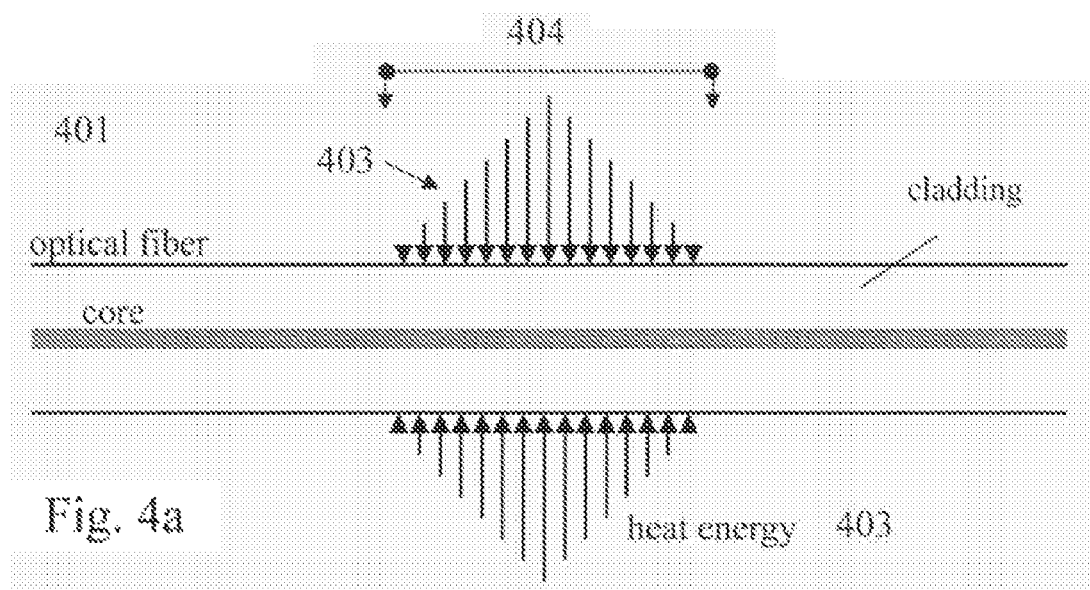
Fig. 4a
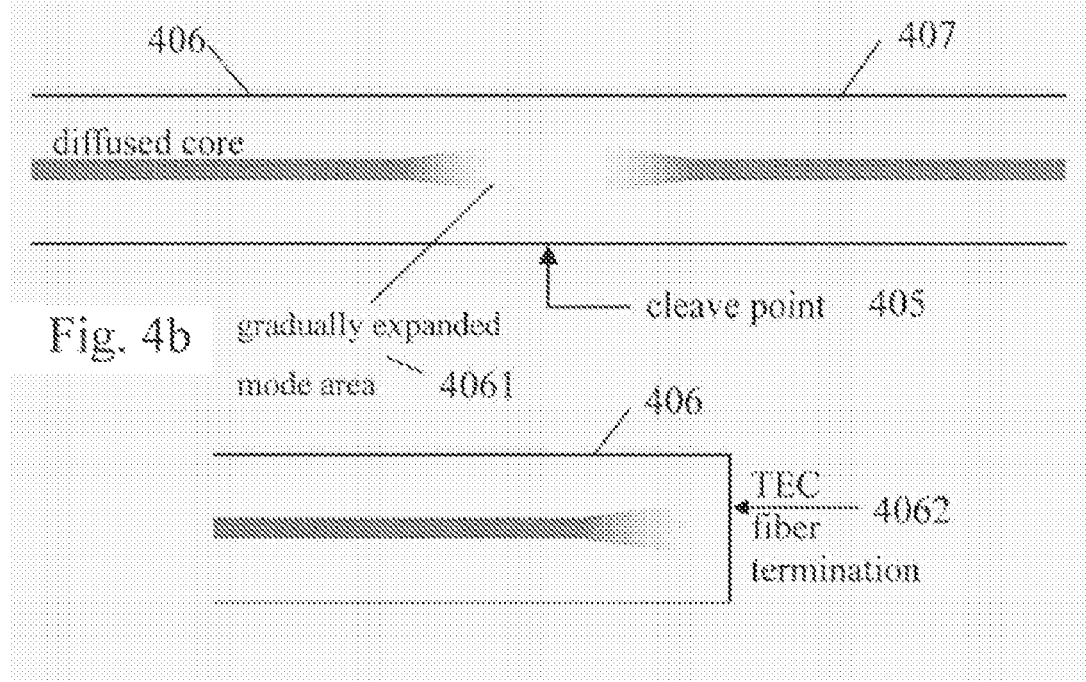
Fig. 4b
Fig. 4c

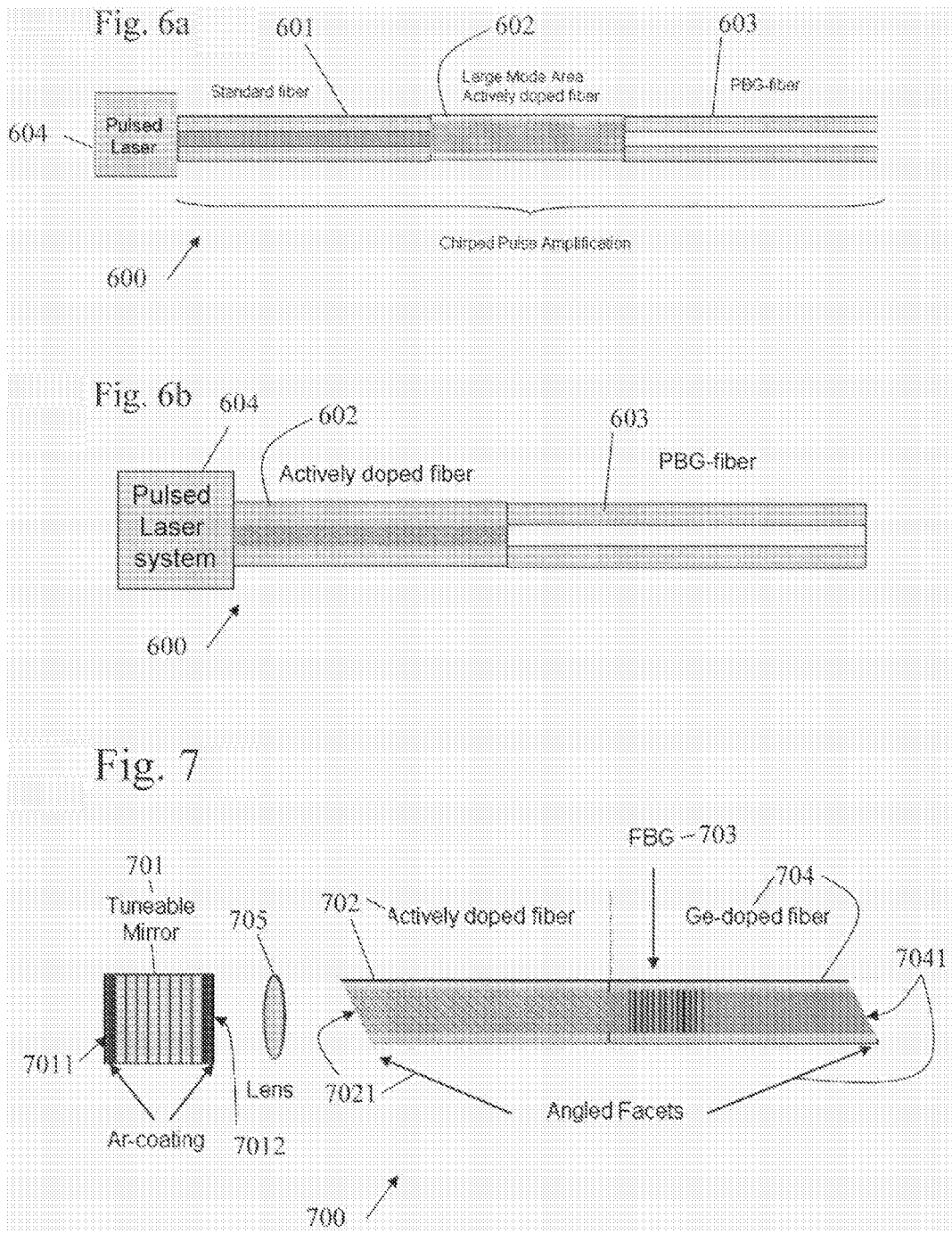

Fig. 29a
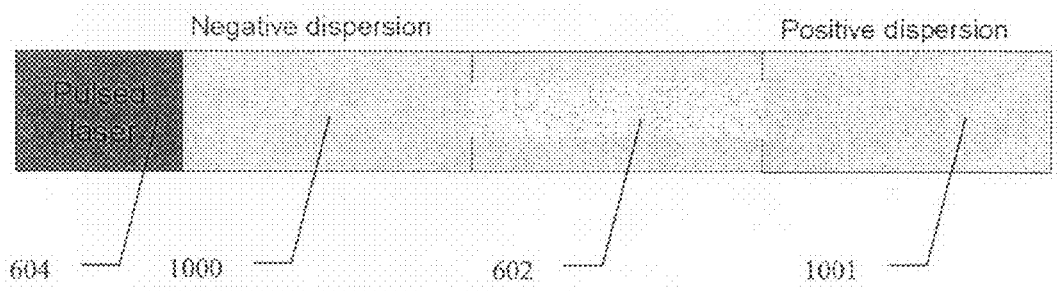
Fig 29b
Fig 29c
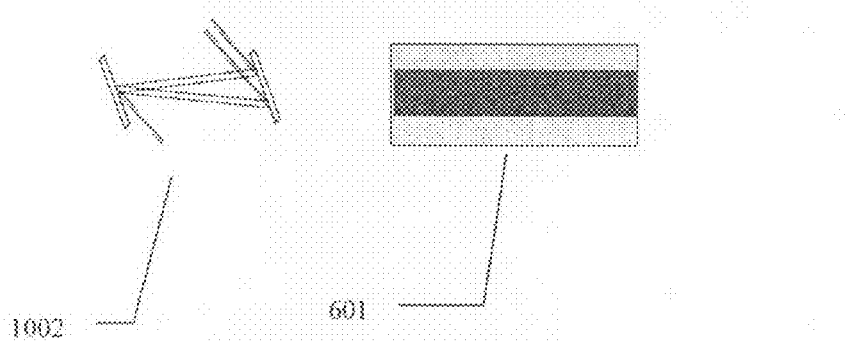
Fig 29d
Fig 29e
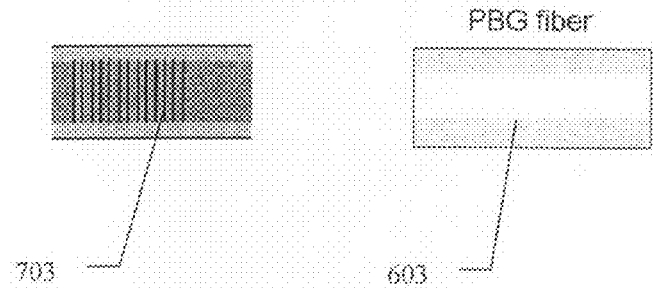

OPTICAL SYSTEM FOR PROVIDING SHORT LASER-PULSES

TECHNICAL FIELD

The present invention relates to optical systems for providing short laser pulses.

BACKGROUND OF THE INVENTION

Short optical pulse generation has become an increasingly important technology in recent years in many applications including laser-based micromachining, thin-film formation, laser cleaning, medicine and biology. Exciting results have been demonstrated with ultra-short pulses in ablation of a wide variety of materials with a minimum of thermal or shock damage to the surrounding materials. Examples include dielectrics, e.g. oxide ceramics, optical glasses, polymers, etc. Short pulses are also powerful instrumentals for surface patterning and micro-fabrication due to the non-contact character of material processing. In particular, higher spatial resolution can be achieved with short pulses by reducing heat-affected zone and shock-affected zone (cf. e.g. X. Liu, D. Du, and G. Mourou, "Laser ablation and micromachining with ultrashort laser pulses", IEEE J. Quantum Electron., vol. 33, pp. 1706-1716, 1997)

Two of the most critical aspects of short pulse laser systems are:
1. To avoid non-linear deteriorations of the optical pulses in the system due to non-linear effects in the intra- or extra-cavity laser system
2. To compress the width of the optical pulses inside or outside the laser cavity. This is typically done by dispersive optical elements Pulse Compression The pulse width of optical pulses propagating in dispersive medium will be either reduced or increased as they propagate through the dispersive medium.

Dispersion within a laser cavity is typically undesired as it typically will broaden the pulse width. In some situations, however, such dispersion may be highly desirable, as it may increase the obtainable pulse energy before any non-linear distortions are introduced. This dispersion is caused either by the material or waveguide dispersion of the laser medium (or by optical elements such as prisms or gratings) or by a non-linear optical phenomenon—the Kerr effect—in which the refractive index of a material is dependent on the light intensity. Regardless of the cause of the dispersion in the laser cavity, the pulse broadening caused by this dispersion has to be compensated to allow very short pulse (typically <5 ps) operation of the laser.

Dispersion outside the laser cavity (extra-cavity) can be desirable as it can be used for pulse compression provided that the pulses entering the extra-cavity medium has the appropriate chirp. Typically the chirp of short pulse lasers will require anomalous dispersion for pulse compression.

In most solid-state lasers manufactured today, the necessary intra- or extra-cavity anomalous dispersion is supplied in the form of prism or grating pairs. A prism or grating pair can be used to compensate for the normal dispersion in the cavity. However, this technique is not applicable to compact and robust lasers.

Although waveguide dispersion in prior art laser systems has been used generally to balance the material dispersion at longer wavelengths (>1.3 µm), this is not feasible in traditional fibers at short wavelengths (<1.3 µm). In traditional fibers, anomalous (positive) dispersion at short wavelengths will require very small core sizes (<4 µm), which will lead to very low non-linear thresholds (i.e. increased non-linear effects) in these fibers. If these fibers were used for dispersion compensation or pulse compression in short pulsed lasers, non-linear effects in the fibers would cause the short pulses propagating in these fibers to break up and thereby destroy the short pulse operation of the laser system.

DISCLOSURE OF THE INVENTION

The objective of the invention is to provide an optical system providing compact and cost-effective short laser-pulses.

This objective has been achieved by the invention as described in the following and as defined in the claims.

It has thus been found that the use of PBG fibers in short pulse laser systems according to the invention can provide fiber based laser systems which compared to prior art systems are improved with respect to having low overall dispersion of the laser cavity and simultaneously having low non-linear deteriorations of the optical pulses in the system due to non-linear effects in the intra- or extra-cavity laser system compared to prior art short-pulsed laser systems.

The terms 'intra-cavity' and 'extra-cavity' are used in the present application in relation to components or activities of an optical system according to the invention to indicate that such components or activities are being located or happening inside or outside, respectively, of a laser cavity of the optical system.

By the present invention it has further shown to be possible to provide compact and mechanically rugged short pulse optical laser systems. Thus in one embodiment the laser system of the invention is compact and mechanically rugged.

Furthermore it has been shown that the laser system of the invention beneficially can be included in solid state lasers (including fiber lasers) operating in the 900-1200 nm window. Such solid state lasers may furthermore be compact and mechanically rugged.

Also, embodiments of the invention provide methods for combining or splicing the different components used in these systems, which result in low loss and low back reflection levels.

In an embodiment, an optical system for generating or processing (e.g. compressing) short laser-pulses according to the invention comprises an optical fiber in the form of a photonic bandgap fiber (PBG), where light propagates in a core surrounded by a cladding and where the refractive index of the core is lower than the effective refractive index of the cladding.

In an embodiment, an optical system for generating or processing (e.g. compressing) short laser-pulses according to the invention comprises an optical fiber in the form of a hollow core or solid core photonic bandgap fiber (PBG), where light propagates in a hollow or a solid core, respectively, the core being surrounded by a Silica cladding and where the refractive index of the core is lower than the effective refractive index of the cladding. In the following, the terms 'hollow core' and 'air-core' are used interchangeably.

In an embodiment, the optical system comprises a laser cavity. In an embodiment, the laser cavity is spatially limited by a pair of optically reflecting elements. In an embodiment, the laser cavity comprises a Bragg grating.

The term 'short laser pulses' is in the present context taken to mean laser pulses having durations smaller than nanoseconds ($10^{-9}$ s), e.g. smaller than 100 picoseconds ($100*10^{-12}$ s), such as in the range from 10 picoseconds ($10*10^{-12}$ s) to femtoseconds ($10^{-15}$ s). The duration of pulses may be taken to mean the value as measured at half peak amplitude.

The term 'a Silica cladding' is in the present context taken to mean a cladding whose solid parts (i.e. exclusive of any micro-structural elements dispersed in the cladding) consist substantially of Silica. A Silica cladding may comprise amounts of intentional or non-intentional dopants or impurities, respectively. In an embodiment, the level of dopants or impurities is such that the optical properties of the cladding region (e.g. the guiding properties of the fiber) are not significantly changed by the dopants or impurities.

Photonic Crystal Fibers

Recently a new class of optical fibers known as Photonic Crystal Fibers (PCF) have been the object of extensive research and are now commercially available from several companies. A PCF is an optical fiber defining a longitudinal direction with an array of microscopic structural elements (termed micro-structural elements or features) running along its length, e.g. a silica optical fiber with air holes. The guidance properties of such Photonic Crystal Fibers are determined by the size and pattern and refractive index of the micro-structural elements (e.g. air holes) and the cladding background (e.g. solid-silica) regions, whereas the guiding properties of a conventional (non-micro-structured) fiber is determined by the properties (in particular refractive index) of the bulk optical glass. Photonic Crystal Fibers can be divided into two classes.

1. Refractive index guiding fibers, where light, like in a normal fiber, propagates in a solid core surrounded by a cladding and where the effective refractive index of the core is higher than the effective refractive index of the cladding. For these types of photonic crystal fibers comprising e.g. air-holes dispersed in a Silica cladding background material, the effective refractive index is defined by the ratio of Silica and air, which the light experiences.
2. Photonic BandGap or PBG fibers comprising a distribution of micro-structural elements (when viewed in a transversal cross-section of the fiber), e.g. air-guiding fibers, where light propagates in a hollow (air) core surrounded by a (e.g. Silica) cladding, or solid core fibers where—in both cases—the (effective) refractive index of the core is lower than the effective refractive index of the cladding. For these types of photonic crystal fibers, the waveguiding properties are defined by multiple reflections experienced by the light at the interface to the substantially periodic distribution of micro-structural elements in the cladding (e.g. at the Silica to air-hole interfaces in the cladding of a PBG fiber with a silica cladding comprising a substantially periodic distribution of air-holes). These reflections can be compared to those of a traditional multi-layer thin film mirror. The arrangement of micro-structural elements around the core may or may not be substantially periodic (when viewed in a transversal cross-section of the fiber).

Traditional Hollow Core Photonic BandGap fibers (HC-PBG fibers) have the advantage of large non-linear thresholds, however for intra-cavity applications these fibers suffer from difficulties in making low return loss splices. Furthermore, mode-coupling to surface modes may appear in these fibers, which can lead to undesired modal dispersion as discussed below.

An alternative to the Hollow core PBG-fiber are the so-called solid core (SC) PBG-fibers, where a pure silica core is surrounded by cladding (e.g. comprising a silica background material) with an array of doped elements (e.g. Ge-doped, to form micro-structural elements having a higher refractive index than the cladding background material and the core). These fibers have lower non-linear thresholds than HC-PBG fibers but have the advantages of:

Simple low return loss splices to standard fiber
No surface modes
The possibility for writing Bragg gratings in these fibers
The possibility of using doped core for amplifying fibers.

Preferably, SC-PBG fibers are used for intra-cavity applications, where it is essential to avoid surface modes and reflections from splices, but where the power levels are relatively low and the non-linear thresholds are less critical.

Preferably, HC-PBG fibers are used for extra-cavity pulse-compression, where the power levels typically are high and high non-linear thresholds are essential, but where fair levels of both back-reflections from splices and surface mode coupling can be accepted.

In a first aspect, the PBG-fiber of the optical system is part of the laser cavity, i.e. is an intra-cavity PBG-fiber, for dispersion compensation. In this embodiment, a short pulse optical system for generating or processing short laser-pulses according to th invention comprises a laser cavity and an optical fiber in the form of a photonic bandgap fiber (PBG), where light propagates in a core surrounded by a Silica cladding and where the refractive index of the core is lower than the effective refractive index of the cladding, wherein the optical system comprises an intra cavity dispersion compensating fiber constituted by said PBG fiber.

In an embodiment, the intra-cavity PBG-fiber is a solid core PBG fiber. Solid core PBG fibers have the advantage of providing anomalous dispersion (which may be relatively easily optimized to specific wavelength requirements) and of being easier to handle (incl. to splice, etc.), having improved doping properties, etc., compared to hollow core PBG-fibers.

In one embodiment, the laser system has an intra cavity defined as the cavity between lasing mirrors.

In an embodiment, the intra cavity of the laser system comprises a modulator, a dispersion compensating fiber and an active medium, wherein said dispersion compensating fiber being a PBG fiber as disclosed above. In an embodiment, the dispersion compensating PBG fiber is a solid core PBG fiber.

In an embodiment, the optical system comprises an active medium (e.g. an actively doped fiber) and a pulsed laser for providing laser pulses wherein the pulsed laser is directly optically connected to said active medium to provide launching of said pulses into said active medium. The term 'directly optically connected' is in the present context taken to mean that the pulses from the pulsed laser are launched directly into the active medium (without first broadening the pulses in a dispersive medium), e.g. via a butt coupling or a splice between two waveguides or optionally via a beam shaping optical component (e.g. an optical lens). The advantage of this configuration is that relatively simple seed lasers with relatively large pulse widths (e.g. $\geq 5$ ps) may be used to provide relatively narrow pulse widths (e.g. $\leq 200$ ps, such as $\leq 700$ fs, such as $\leq 200$ fs).

The active medium may in principle be any type as it is generally known in the art. In one embodiment the active medium is a waveguide or an actively doped semiconductor wafer. In another embodiment the active doped medium is a doped fiber, such as a Nd-, Yb—Er-, Pr- or a Tm-doped fiber or a fiber doped fiber comprising one or more rare-earth dopant elements, e.g. Er—Yb. In a preferred embodiment, the active medium is a Large Mode Area actively doped photonic crystal fiber.

Fiber Lasers (Laser with Doped Fiber)

One particularly interesting class of compact and robust short pulse lasers is fiber lasers. For these lasers, the broad fluorescence spectrum and long exited state lifetime makes different fiber gain media (such as Nd-, Yb—Er-, Pr- and Tm-doped fibers) very attractive for ultra-short pulse sources. Of these active dopants, Nd and Yb are particular interesting as these provide very effective optical pump to signal conversion in Silica fibers. Optical conversion efficiencies up to 80% has been reported for Silica fibers doped with Nd or Yb. The main difficulty associated with pulse generation in Yb- and Nd-doped fiber lasers, which operate in the wavelength interval around 900-1200 nm, results from the high value of negative (normal) material dispersion for silica at wavelengths below 1.2 µm.

Intra Cavity Modulators

In order to generate pulses within the laser cavity some kind of intra-cavity modulator is required. The modulator can be either active (e.g. acousto-optic, $LiNbO_3$ crystal, semiconductor) or passive (e.g. saturable absorber, additive pulse mode locking (APM), coupled cavity). Many of these modulators are bulky and expensive components which are not suited for rugged and low cost components. The modulator technology most suited for this purpose is based on semiconductors of which the semiconductor saturable absorber mirrors (SESAM) have attracted significant interest recently. SESAMs have been used successfully to initiate and to sustain mode-locking in a wide range of solid-state and fiber lasers (cf. e.g. U. Keller et al., "Semiconductor saturable absorber mirrors (SESAM's) for femtosecond to nanosecond pulse generation in solid-state lasers", IEEE J. Sel. Top. Quantum Electron., vol. 2, pp. 435-453, 1996 or T. Jouhti et al., "Dilute nitride vertical-cavity surface-emitting lasers", New J. Phys., 5, pp. 84.1-84.6, (2003)). The important aspect of using the SESAM in pulsed lasers is the flexibility in controlling the mirror parameters such as absorption recovery time, saturation fluence and insertion loss through the device design, growth conditions, and heavy ion implantation. Exploiting the SESAM as a cavity mirror in the fiber laser results in compact size, environmentally stable and simple ultra-short pulse lasers that can cover wide wavelength range, and generate optical pulses with durations from nanoseconds to femtoseconds. A SESAM typically consists of a mirror and a saturable absorber material monolithically grown by epitaxy. Conventional AlGaAs/AlAs SESAMs based on the low cost GaAs technology operate at center wavelengths of 800-1300 nm and are particularly well suited to operate with Nd and/or Yb doped optical fibers.

One issue of the SESAM technology is that as it is based on a passive mode locking mechanism, it does not allow external control of the laser pulse width or repetition rate.

In an embodiment of the optical system, the modulator is a semiconductor saturable absorber mirror (SESAM) modulator.

In an embodiment, a Large Mode Area actively doped photonic crystal fiber is used within a SESAM based laser cavity e.g. to provide gain in a medium with high non-linear thresholds.

In an embodiment, the dispersion compensating fiber and the active medium are coupled to each other, optionally with one or more intermediate light transmitting elements.

In a second aspect, the PBG-fiber of the optical system is NOT (necessarily) part of the laser cavity, i.e. the optical system comprises an extra-cavity PBG-fiber, for pulse compression. The pulse compressing extra-cavity PBG-fiber may be used in combination with any laser system (be it fiber-based or not) and with other extra-cavity optical elements e.g. for amplification.

In such an embodiment of an optical system according to the invention, a short pulse optical system for generating or processing short laser-pulses comprises a laser cavity and an optical fiber in the form of a photonic bandgap fiber (PBG), where light propagates in a core surrounded by a Silica cladding and where the refractive index of the core is lower than the effective refractive index of the cladding, wherein the optical system comprises extra-cavity light transmission element(s) coupled to the laser cavity to receive an output beam there from, the extra-cavity light transmission element(s) comprising one or more fibers, including said PBG fiber for compressing the width of the pulses launched from the system.

In another particular embodiment, the optical system comprises an intra-cavity PBG-fiber for dispersion compensation in combination with an extra-cavity PBG-fiber for pulse compression. The features relating to extra-cavity components discussed in the following may thus be related to an optical system wherein the laser cavity does or does not comprise an intra-cavity dispersion compensating PBG-fiber.

In an embodiment, the optical system comprises a further PBG-fiber outside the laser cavity, i.e. an extra-cavity PBG-fiber. In one embodiment of the invention, the laser system has an extra-cavity in the form of light transmission element(s) coupled to the intra cavity to receive an output beam there from, the extra-cavity preferably comprises one or more fibers. The extra-cavity may preferably comprise a PBG fiber. In an embodiment, the PBG fiber of the extra-cavity is an air-core PBG fiber for pulse compression. This has the advantage of providing relatively low non-linear effects (i.e. high non-linear thresholds) even in relatively high power applications.

In an embodiment, the pulse compressing PBG fiber is characterized by mode field diameters above 5 µm, such as above 10 µm, such as above 20 µm, such as above 40 µm. A relatively larger core results in a lower energy density and thus lower non-linearity (for a constant light energy; or alternatively a relatively larger core allows a larger light energy to be propagated with the same non-linearity as the relatively smaller core).

In an embodiment, the pulse compressing PBG fiber is characterized by a dispersion larger than +50 ps·nm$^{-1}$·km$^{-1}$, such as larger than +100 ps·nm$^{-1}$·km$^{-1}$, such as larger than +150 ps·nm$^{-1}$·km$^{-1}$ in selected parts of the wave guiding band (i.e. relevant parts of the wavelength range of the signal). A relatively larger dispersion results in a lower necessary length of the fiber and thus lower non-linearity.

In an embodiment, the pulse compressing hollow core PBG fiber is characterized by at least 50% of the energy propagating outside of silica (i.e. in "air"). In an embodiment, at least 50% of the energy of the PBG fiber is confined to the core of the fiber, such as at least 70%, such as at least 85%, such as at least 95%. The larger the amount of the light energy that is confined to air, the relatively lower non-linearity is provided. The degree of confinement of light to the core may e.g. be calculated by numerical methods from knowledge of the electrical field in the framework of the fiber structure, the materials used, the size, distribution and structure of the micro-structural elements, etc.

In an embodiment, the width of the optical pulses is compressed in the extra-cavity, preferably by a hollow core PBG fiber. In an embodiment, the pulses are compressed to 50% of their original width, such as to 30%, such as to 10%, such as to 5%, such as to 2% of their original width. The achievable degree of compression is governed by the amount of chirp and spectral width of the pulses, the dispersion characteristics of the compressing fiber and its length.

In an embodiment, the optical pulses propagate in the non-solitonic regime in the PBG-fibre (e.g. as indicated by a changing pulse width along the length of the fibre).

In an embodiment, the optical system is a mode-locked laser.

Chirped Pulse Amplification

Any short pulse laser cavity will have a limit to the output power and for many applications it will be necessary to amplify the pulses after they are emitted from the cavity. Fiber based optical amplification is very attractive for this purpose as single-mode fibers are flexible and potentially low-cost devices, which yield diffraction limited beams with little or no need for alignment. However, as fiber-based sources confine light to relatively small areas over at least a few meters or centimeters, the optical nonlinearity distorts pulses with high peak powers. Typically, nonlinearity threshold is reached at a peak power of ~1 kW divided by the fiber length in meters (or centimeters), while megawatt peak powers are obtainable with bulk sources. To overcome this problem and increase the peak power achievable with fiber systems a chirped pulse amplification can be employed.

The chirped pulse amplification technique consists of chromatically dispersing the optical pulses, amplifying the temporally broadened pulses, and recompressing them in a dispersive medium with the reciprocal chromatic dispersion. Each dispersive medium can be a pair of diffraction gratings, an optical fiber, or a fiber Bragg grating. The advantages of using all-fiber components are that simpler configurations that do not require alignment are obtained. However, again the problem is that the achievable peak powers are limited by fiber nonlinearity. These non-linear limitations are particularly critical at the output end of the amplifier, where the pulse energies are the highest.

In one embodiment, the laser system according to the invention comprises elements for chirped pulse amplification comprising elements for chromatically dispersing the optical pulses, amplifying the temporally broadened pulses, and recompressing them in a first dispersive medium with the reciprocal chromatic dispersion, the first dispersive medium preferably being selected from the group of a pair of diffraction gratings, an optical fiber, or a fiber Bragg grating. In an embodiment, the extra-cavity first dispersive medium is a PBG fiber. In an embodiment, the dispersive PBG fiber of the extra-cavity first dispersive medium is a hollow core PBG fiber. In an embodiment, the extra-cavity element for amplifying the temporally broadened pulses is a Large Mode Area actively doped photonic crystal fiber.

Chirped Pulse Compression

Another method for providing high power optical pulses with a narrow pulse width is to use relatively broad pulses which are chirped, amplified and compressed beyond their original pulse width In an embodiment, the extra-cavity light transmission element comprise elements for non-linear spectral pulse broadening and pulse compression in a second dispersive medium, the extra-cavity second dispersive medium preferably being selected from the group of a pair of diffraction gratings, an optical fiber, or a fiber Bragg grating. In an embodiment, the extra-cavity second dispersive medium is a PBG fiber. Alternatively the extra-cavity second dispersive medium is a standard fiber fiber.

The chirped pulse compression technique consists of spectrally broadening the optical pulses, this can for example be done by Self Phase Modulation in an optical fiber. The chirped pulses are then amplified (amplification and chirp can also be done simultaneously in the same optical fiber). Finally, the pulses are compressed in a dispersive medium with the anomalous dispersion. As the pulses have been chirped, pulse compression beyond the original pulse width is now possible. The advantage of this approach is that a cost-effective seed laser with relatively wide pulse width (e.g. 5 ps) can be used to generate very short pulses (e.g. pulse widths <500 fs). To obtain high compression factors, the pulse shape should advantageously be taken into account. For a pulse with a parabolic pulse shape, the chirp obtained by non-linear effects is linear, and can hence be compressed with linear dispersive elements, cf. e.g. Optics Letters, Vol. 31, No. 5, pp. 574-576 (2006).

Splicing

Generally, the fibers, including PBG fibers and possible other photonic crystal fibers, of the optical system should be spliced to other fibers or fiber-components of the system or to external systems by state of the art splicing methods, e.g. fusion splicing to provide a low loss optical coupling with low back reflections.

In an optical system according to the invention, it may be preferable that the intra-cavity and/or extra-cavity PBG fiber(s) is/are angle spliced to an index guiding fiber to provide a low back reflection combination of the two fibers. In an embodiment, the index guiding fiber is a standard fiber or a PCF.

In an embodiment, the optical system comprises a large mode area photonic crystal fiber wherein the large mode area photonic crystal fiber is spliced to an index guiding and mode expanded fiber to provide a low loss combination of the two fibers. In an embodiment, the index guiding and mode expanded fiber is a standard fiber or a PCF.

Further embodiments of the invention are described in the detailed description and in the claims.

BRIEF DESCRIPTION OF THE DRAWINGS

FIG. 1a shows a schematic generalized optical system for providing short laser pulses. FIG. 1b shows an example of a mode locked fiber laser according to an embodiment of the present invention where a large mode area, active PCF is used as a gain medium and a PBG-fiber is used for dispersion compensation.

FIG. 2a shows a mode locked laser based on a SESAM, a PBG fiber and a large mode area fiber. The PBG-fiber and the large mode area fibers are spliced with a low loss, low back reflection splice using an intermediate fiber with an adiabatically expanded optical core. The output mirror of the short pulse laser system is based on a fiber Bragg grating written directly in the output fiber. FIG. 2b shows an embodiment with a side-pumped configuration.

FIG. 3 shows various photos of splicings of a photonic crystal fiber (PCF) to a conventional standard single mode fiber (SMF), FIG. 3a showing a photo of an angle cleaved PCF (left) aligned to a SMF28 (right), cleaved at 10.5 degrees; FIG. 3b being a photo of an angle cleaved PCF (left) aligned to a SMF28 (right), cleaved at 8.1 degrees; and FIG. 3c being a photo of the above angle cleaved PCF (left) spliced to a SMF28 (right);

FIG. 4 shows the principle used for Thermally Expanded Cores (TEC), illustrating 3 steps in the process in FIGS. 4a, 4b, 4c respectively;

FIG. 6a shows a chirped pulse fiber amplifier based on a traditional optical fiber providing negative dispersion and pulse broadening. This is followed by an actively doped large mode area PCF to provide gain and a PBG fiber with anomalous dispersion and large non-linear thresholds to provide pulse compression;

FIG. 6b shows a fiber amplifier configuration. An actively doped fiber provides gain and spectral broadening to a signal launched from the seed laser. An output PBG fiber with anomalous dispersion and large non-linear thresholds provide pulse compression and the resulting pulse-width at the output will typically be shorter than the pulse-width at the input;

FIG. 7 shows a Q-switched laser based on a tuneable mirror, a gain medium and a fixed mirror;

FIG. 29a is a schematic diagram of an embodiment described herein having a pulsed laser and a chirped pulse fiber amplifier. FIG. 29b-e are schematic diagrams of examples of components for use in the chirped pulse amplifier shown in FIG. 29a. FIG. 29b shows a pair of diffraction gratings, FIG. 29c shows a standard optical fiber, FIG. 29d shows a fiber Bragg grating, and FIG. 29e shows a PBG fiber.

DETAILED DESCRIPTION

Figure 5A:
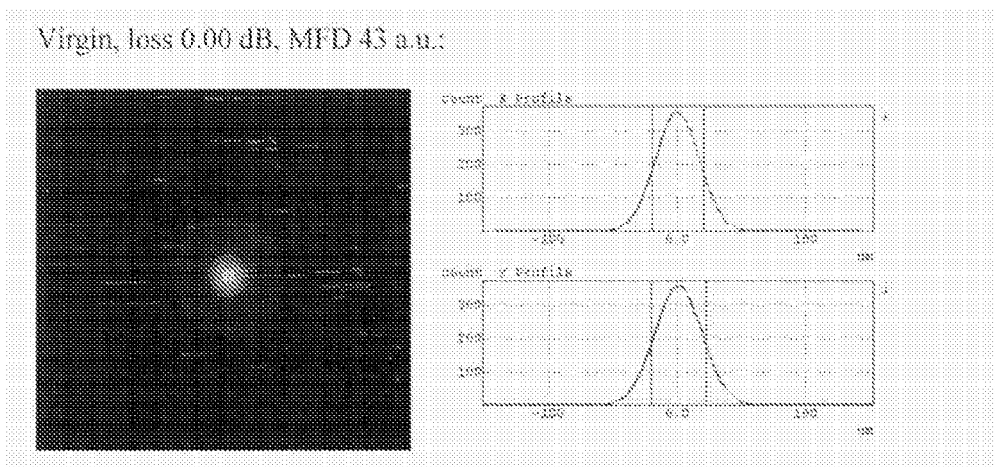
FIG. 5a being before treatment, FIG. 5b after 3 TEC cycles, and FIG. 5c after 6 cycles, respectively.

In order to present the invention, the proceeding description shall be based on examples. The examples act to illustrate the concepts and design ideas that underlie the invention. It is to be understood that the examples are merely illustrative of the many possible specific embodiments which can be devised from the present invention as well as there exists many possible applications that may be devised from the principles of the invention. The presented examples are not intended to limit the scope of the invention.

FIG. 1a shows a generalized short pulse laser system 100, consisting of a gain medium 101, two mirrors 102, 103, a modulator 104 and a dispersion compensating section 105. Apart from the mirrors at the extremes of the laser cavity the order of these components can be exchanged. FIGS. 1a and 1b show a linear cavity: however, the same principles apply for a ring laser. No pump source is shown in FIG. 1.

The modulator 104 can be either active (e.g. Acousto-Optic, $LiNbO_3$ crystal, Semiconductors) or passive (e.g. Saturable absorber, APM, coupled cavity). Furthermore, the modulator can symbolize more general methods of mode locking such as Kerr lens mode locking and Pulsed pumping.

The gain medium 101 can be made of traditional gain media such as solid state crystal, conventional active fibers or semiconductors. However, in a preferred embodiment of this invention as shown in FIG. 1b, the gain medium 101 is provided by an active large mode area (LMA) index guiding PCF 1011. Preferably this fiber is doped with Nd and/or Yb, to obtain a high optical pump to signal conversion efficiency, and is operating at wavelengths in the interval from 900 to 1200 μm. Due to the unique structure of refractive index guiding PCFs, they provide a new degree of design freedom compared to traditional optical fibers. By a proper design of the refractive index guiding PCF it is possible to obtain truly (transverse) single mode fibers with very large mode areas. For example photonic crystal fibers with mode field diameters >15 μm, preferably >20 μm can be manufactured, whereas the typical mode diameter for a conventional fiber is of the order of 10 μm. As the non-linear thresholds in these fibers scale with the square of the mode diameter, LMA fibers will have significantly higher non-linear thresholds than conventional fibers, which is a specific advantage of the present invention.

Actively doped LMA fibers are commercially available from a number of manufacturers, including Crystal Fibre A/S (of Blokken 84, DK-3460 Birkerød, Denmark) which provides Large Mode Area Yb-doped double clad fibers, with mode area diameters exceeding 20 µm. One example of an LMA fiber which may be used in the present invention is a fiber of the type DC-150-28-Yb, which has a core diameter of 28 µm and a mode field diameter of 21 µm. More details on the general principles and design aspects of LMA PCFs can be found in the book: Bjarklev, Broeng and Bjarklev: "Photonic Crystal Fibers", Kluwer Academic Publishers, 2003 (cf. e.g. chapter 7.2), termed [Bjarklev et al.] in the following and which is incorporated herein by reference. LMA-fibers with even higher core diameters are possible and feasible, e.g. core diameters larger than 35 µm, such as larger than 45 µm. In particular embodiments, such fibers guide light in the core in a single mode.

The dispersion compensating section 105 of the laser embodiment shown may e.g. be provided by a PBG PCF 1051, as shown in FIG. 1b. The PBG fibers to be used for this invention are characterized by high non-linear threshold and high values of anomalous dispersion. For the right choice of PBG PCF, most of the light (up to 80%) propagates through air in the core, making the fiber nonlinear coefficient ~1000 times lower than that of conventional fibers. The maximum peak powers for linear pulse propagation are, therefore, accordingly higher.

By a proper selection of PBG PCF it is furthermore possible to utilize the PBG fiber in a domain where relatively high anomalous dispersion (>50 ps nm$^{-1}$ km$^{-1}$, preferably >100 ps nm$^{-1}$ km$^{-1}$) can be achieved at wavelengths <1300 nm.

PBG photonic crystal fibers are commercially available from a number of manufacturers, e.g. Crystal Fibre A/S, which provides PBG crystal fibers with high non-linear thresholds and high anomalous dispersion at wavelengths below 1300 nm. Two examples are AIR-12-1060 and AIR-6-800. More details on the general principles and design aspects of PBG PCFs can be found in [Bjarklev et al.].

FIG. 2 shows a mode locked laser 200 based on a SESAM 202, 204, a PBG fiber 205 and a large mode area fiber 201 having a core 2011 and a cladding 2012. The PBG-fiber and the large mode area fibers are spliced with a low loss, and a low back reflection using an intermediate fiber 206 with an adiabatically expanded optical core 2061 and a cladding 2062. Interfaces between the intermediate fiber 206 and the PBG-PCF 205 and the actively doped LMA-PCF 201 fibers, respectively, are indicated by reference numerals 208 and 209, respectively. The output mirror 203 of the short pulse laser system can be based on a fiber Bragg grating (FBG) written directly in the output fiber 210 as shown in FIG. 2a. The FBG may be written in the actively doped LMA PCF or alternatively in a conventional fiber. However, the output mirror 203 can also be provided simply by a cleaved fiber facet.

Typically, these lasers will operate at wavelengths below 1300 nm, where the PBG-fibers are most important for dispersion compensation and where the optical pump to signal conversion of the gain fiber is the highest (typical Nd- or Yb-doped fibers operating in the 900-1200 nm band, with optical conversion efficiencies up to 80%). The SESAM can be a conventional SESAM as they are described extensively in the literature (cf. e.g. R. Paschotta et al., Applied Physics Letters, vol. 75, no. 15, p. 2166-68, which is incorporated herein by reference). The interface between the fiber and the SESAM can for low loss coupling be made with a lens (e.g. a single f=4.5 mm lens). Alternatively a more simple laser configuration with a slightly higher loss can be obtained by butt-coupling the fiber to the SESAM.

The active large mode area fibers can be both traditional single core/clad fibers and double-clad structures for high power multimode pumping, e.g. an LMA DC-150-28-Yb fiber from Crystal Fibre A/S. A wide range of doping materials are available (e.g. Nd, Yb, Er, Pr and Tm).

In general it will be preferable to avoid residual pump light to couple into the SESAM. This can be avoided by a number of methods such as forward pumping or residual pump decoupling. For single-clad fibers forward pumping can be done for example by having a pump multiplexing WDM (e.g. L2SWM 977/1064x from JDS Uniphase) at the interface between the PBG and the large mode area fiber. One elegant option would be to implement the WDM 2063 in the intermediate fiber 206 as shown in FIG. 2b. Alternatively, a fiber Bragg grating (written for example in the intermediate fiber) could reflect any residual backwards propagating pump light.

For double clad fibers residual pump light will in general not couple into the SESAM as it is not propagating in the single mode core. An elegant—all waveguide—solution would be to side pump (as indicated by arrow 207 in FIG. 2b) the double-clad fiber 201 and thereby avoiding the need for dichroich optical couplers, cf. e.g. international patent application no. PCT/DK03/00180 "Microstructured optical fibre with cladding recess, a method of its production, and apparatus comprising same" (published as WO-03/079077).

For an optimal operation of a pulsed laser it is preferable to avoid any undesired reflections within the laser cavity. Critical points in this respect are the interfaces 208, 209 between the PCFs and the solid core fibers. Splicing conventional, solid fibers together will normally result in minimal reflection from the splice interface, as there is no significant change in index of refraction between the two fibers. For splicing PCFs to solid fibers or splicing two PCFs together, back reflection can be a problem. If the two fibers have significant differences in core sizes, in mode sizes or in effective refractive index for the modes, significant reflections can occur.

For PBG fibers with an air-core, these reflections may be a particular problem. If the fiber end is spliced or butt coupled to a silica core fiber (solid or micro structured), the light propagating down the fiber experiences a large index change at the splice interface. Since the core material changes from air to silica, the refractive index changes from 1 to ~1.45, which will cause a Fresnel reflection of 4% (−14 dB) for normal incidence.

The present invention solves this by preventing the reflected light to be guided backwards in the fiber system. In preparing both fibers for the splice they are preferably cleaved or cut at the same angle (see FIGS. 3a, 3b). FIGS. 3a and 3b show cleaved photonic crystal fibers 301 (left) aligned to a SMF28 302 (right), cleaved at angles of 10.5 degrees and 8.1 degrees, respectively. The single mode fiber 302 may be of any appropriate type, e.g. an SMF28 fiber as indicated here and e.g. a SMF-28e fiber from Corning Incorporated. When aligning the fibers for the splice, the fibers are preferably rotated relative to each other so that the angled facets 3011, 3021 are parallel. After the splice, the splice interface 303 defines an angle being substantially identical to this angle (see FIG. 3c).

The mode field diameter (MFD) of large mode area fibers will typically be >15 µm, preferably >20 µm, whereas the mode field diameter of PBG fibers is in the order of 10 µm. If such two fibers are coupled or spliced together without any mode matching, the transmission through the interface (the coupling) would be quite poor, typically less than −3 dB (50%). This is of importance for most short pulse applications, in particular for intra-cavity use. Furthermore, high levels of back reflection can be associated with such a poor coupling.

One preferred method to reduce this loss is to utilize an intermediate fiber between the large mode area and the PBG fiber (cf. 206 in FIG. 2). This intermediate fiber will have a mode field diameter which matches the mode field diameter of the PBG fiber and is angle spliced to the PBG-fiber (cf. FIG. 3). Towards the end of the intermediate fiber interfacing the large mode area fiber (interface 209 in FIG. 2), the mode field diameter of the intermediate fiber is expanded to match the mode field diameter of the large mode area fiber (as indicated by the matching cores 2061 and 2011 of the intermediate fiber 206 and the actively doped LMA PCF 201, respectively, of FIG. 2).

One preferred method of performing this mode expansion is by the so called Thermal Expanded Core (TEC) method. This can be performed in a standard splicer, e.g. a Vytran FS2000 from Vytran Corporation, Morganville N.J., USA. The working principle behind the mode expansion is that by heating up the fiber, the dopants defining the core diffuse away from the centre, increasing the core and thus the MFD.

FIG. 4 illustrates the principle used in TEC. First two identical non LMA fibers are spliced together (as shown in FIG. 4a). This splicing is important to assure that the splicer does not introduce any stress in the region to be heated. The heat (as indicated by the centrally located arrows 403 in FIG. 4a) is applied to the fiber 401 over a region 404 of several 10 ths of μm. Most of the heat is applied to the center and the amount of heat is the gradually reduced towards the ends of the TEC region (as indicated by the lengths of arrows 403). The fiber is cleaved at the center 405 of the heated region (as indicated in FIG. 4b) and two fibers 406, 407 with a gradually expanded mode area 4061, 4071 are available. An example of fiber 406 with a gradually expanded mode area 4061 at one end 4062 of the fiber is shown in FIG. 4c. If the heating is applied in the correct way over an appropriate length 404 of fiber, large mode field expansions with minimum loss can be obtained.

Figure 5B:
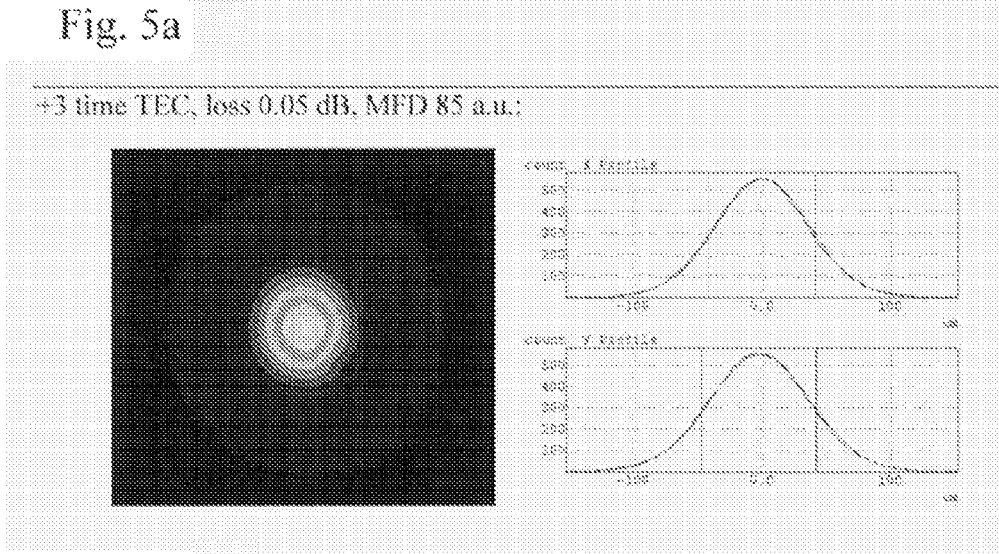
FIG. 5 shows examples of a conventional fiber with a thermally expanded core and the mode field diameters and loss resulting from the thermal expansion.
Figure 5C:
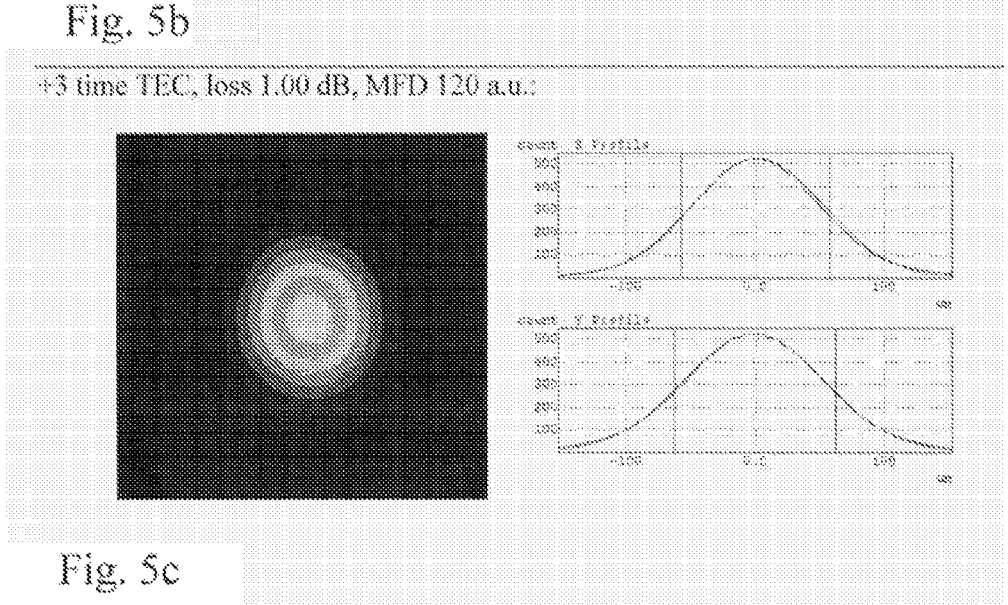

This is illustrated in FIG. 5, where the photos illustrate the mode field in a cross section of a fiber and the graphs denoted X Profile and Y profile show the mode field in two perpendicular directions of the cross section (X- and Y-, respectively). FIG. 5a shows the mode field for a conventional SMF28 fiber before TEC is applied. FIG. 5b shows a situation after 3 TEC cycles, the mode field diameter is expanded to approximately twice the original size with an additional loss of only 0.05 dB. After additional 3 TEC cycles, the mode field diameter is expanded to approximately trice the original size with an additional loss of 1 dB. In both cases as illustrated in FIG. 5c, these losses are much lower, than what would have been the case if the two fibers had been spliced together directly without mode expansion.

FIG. 6a shows a chirped pulse fiber amplifier 600 based on a traditional optical fiber 601 (termed 'standard fiber' in FIG. 6) providing negative dispersion and pulse broadening. This is followed by an actively doped large mode area fiber 602, preferably a PCF, to provide gain and a PBG fiber 603 with anomalous (positive) dispersion and large non-linear thresholds to provide pulse compression. The chirped pulse fiber amplifier 600 further comprises a pulsed laser 604.

The chirped pulse amplifier shown in FIG. 6a can also function as a pulse compressor provided that the pulse-duration is longer than the transform limited pulse-duration corresponding to the spectral width of the pulse. In this case a chirped pulse amplifier with a net dispersion different from zero can provide pulse width compression.

A particularly interesting configuration for pulse compression uses Self Phase Modulation in the fiber to broaden the spectrum and an anomalous dispersed fiber (e.g. a PBG fiber) to compress the pulses. In which case the pulse width emitted from the chirped pulse amplifier can be shorter than the width of the pulses launched into the chirped pulse amplifier.

This invention is particularly advantageous in the sense that it addresses the non-linear issues of the chirped pulse amplifier at the output end, where the non-linear limitations are most critical. The actively doped LMA PCFs 602 will have a high non-linear threshold and can be either a single clad or a double clad fiber. The PBG fiber 603 is preferably selected to have high anomalous dispersion at the wavelengths of interest and the system will benefit both from the high non-linear thresholds of the PBG fiber as well as from the short length of PBG fiber required due to the high dispersion values. In an embodiment of the invention, LMA PCF and PBG fibers from Crystal Fibre A/S (as referenced above) are used. An example of a conventional high power fiber chirped pulse amplification systems based on cladding pumped rare-earth doped fibers is e.g. disclosed in U.S. Pat. No. 5,696,782, which is incorporated herein by reference.

FIG. 6b shows another configuration of fiber based pulse fiber amplifier 600. In this case the pulses from the seed laser 604 are launched directly into an amplifying fiber 602 without first broadening the pulses in a dispersive fiber. In this configuration the spectrum of the pulses is broadened in the amplifying fiber due to self-phase modulation and the pulses can then be compressed by the PBG-fiber 603 at the output. The advantage of this configuration is that relatively simple seed lasers with relatively broad pulse widths (e.g. 5 ps) in a simple fiber-based configuration can be simultaneously amplified and compressed to narrow pulse widths (e.g. $\leq$200 fs).

FIG. 7 shows a Q-switched laser 700 based on a tuneable mirror 701, a gain medium 702 and a fixed mirror 703 (e.g. but not necessarily a FBG as illustrated in FIG. 7 in the form of a Bragg grating written into a Ge-doped fiber 704). The operating principle behind this invention is that the Q-value of the cavity is high when the two mirrors are operating at the same wavelength, whereas it is low when the two mirrors are operating at different wavelengths. In an advantageous embodiment of this invention the tuneable grating mirror 701 is realised in a semiconductor material and used in connection with a fiber laser. Compared to other active Q-switching modulators, semiconductor devices are unique in terms of size, ruggedness, cost and well proven interface techniques towards optical fibers.

Grating mirrors in semiconductor materials are well known to those skilled in the art of DFB (Distributed Feed-Back) lasers, DBR (Distributed Bragg Reflector) lasers, VCSELs (Vertical Cavity Surface Emitting Laser) and SESAMs. However in these cases, the mirror is combined with an active semiconductor section.

The tuneable semiconductor grating mirror 701 is formed into passive (i.e. not containing active-layer material) waveguides. For edge coupled semiconductors such gratings can be etched into the semiconductor waveguide by methods known to those skilled in the art from gratings manufactured in DFB semiconductor lasers and in particularly wavelength tuneable DBR-lasers. For surface coupled semiconductors such gratings can be manufactured by Bragg stacks by methods known to those skilled in the art of VCSEL and SESAM manufacturing. The general concepts of and design parameters for conventional VCSELs and Bragg stacks are e.g. discussed by K. J. Ebeling: "Analysis of vertical cavity surface emitting laser diodes (VCSEL)" (published in NATO ASI Series: Semiconductor Quantum Optoelectronics: "From Quantum Physics to Smart Devices", Proceedings of the Fiftieth Scottish Universities Summer School in physics (St Andrews, Jun. 21, 1998 to Jul. 4, 1998) edited by Alan Miller, p. 295-338) which is incorporated herein by reference. Tuning is provided by current injection (positive biasing) or voltage (negative biasing) with mirror tuning ranges (for edge coupled semiconductors being injection current tuned) up to 15 nm. For injection tuning, relatively small currents are needed, e.g. 8 nm tuning range has been reported for tuning currents of 100 mA. Furthermore, tuning speeds below 10 ns has been reported for injection current controlled tuneable semiconductors DBR lasers based on tuning of passive grating sections (cf. e.g. E. Bruce, IEEE Spectrum, vol. 39, no. 2, pp. 35-39). These characteristics makes the current injection tuned passive semiconductor gratings very well suited for Q-switching of fiber lasers with pulse durations in the ns range.

The laser has a high Q-value only when the two gratings are operating at the same wavelength. By using a fixed grating with a narrow bandwidth (e.g. <1 nm, preferably <0.5 nm) the semiconductor mirror tuning range needed for Q-switching becomes very small (it is comparable to the fixed filter bandwidth) and fast Q-switching can be obtained.

As the active medium for this laser, a large mode area fiber is used. This has the distinct advantage that pulse powers, orders of magnitude higher than possible with semiconductor gain media, can be achieved.

For a correct operation of the Q-switched laser, it is of a certain importance that reflections are provided only by the two laser mirror. This can be obtained by AR-coating (AR=anti reflective) of both facets 7011, 7012 of the semiconductor tuneable mirror 701 (as indicated in FIG. 7), by using angled facets 7021, 7041 at both ends of the fiber cavity fibers 702, 704 (as indicated in FIG. 7) and by using low back reflection splicing technologies if more than one fiber is used within the laser cavity. An optional lens (or other focussing or beam shaping optical element) as indicated by reference numeral 705 is shown between tuneable mirror 701 and actively doped fiber 702.

More details on the general principles and design aspects of short pulsed laser systems can be found in the two books: Peter W. Milonni and Joseph H. Eberly, "Lasers", John Wiley & Sons, 1988 and in Jean-Claude Diels and Wolfgang Rudolph: "Ultrashort Laser Pulse Phenomena: Fundamentals, Techniques, and Applications on a Femtosecond Time Scale" Academic Press, San Diego, 1996 which are incorporated herein by reference.

Figure 8:
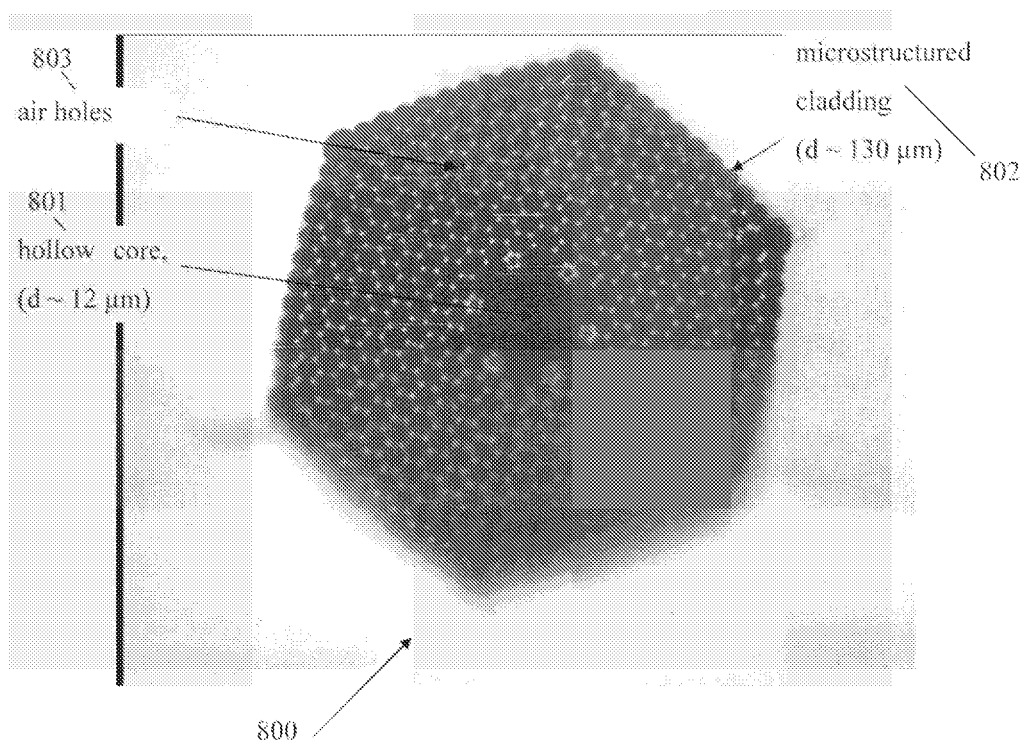
FIG. 8 shows an example of a cross section of an air guiding photonic bandgap fiber for use in a laser system according to the invention.

FIG. 8 shows an example of a commercially available PBG photonic crystal fiber 800 with high non-linear thresholds and high anomalous dispersion at wavelengths below 1300 nm as may be used in embodiments of the present invention. In the example shown in FIG. 8, the hollow core 801 has a diameter of app. 12 µm and the micro-structured cladding 802 comprising a multitude of air holes 803 has a 'diameter' of app. 130 µm. However, other fibers with other dimensions and structural compositions (e.g. other distributions of the air holes and/or air holes filled with a solid or fluid material) may be used in the present invention.

Figure 9:
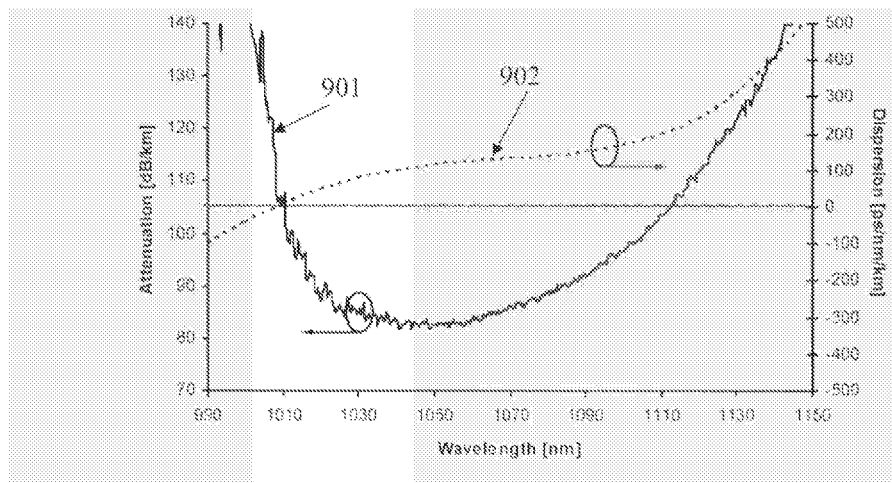
FIG. 9 shows the attenuation and dispersion of a PBG-fiber (HC-1060-02 from Blaze Photonics). It is noticed that anomalous (positive) dispersion is provided over the most of the wavelength range providing low loss.

FIG. 9 shows an example of attenuation 901 and dispersion 902 for a commercially available PBG photonic crystal fiber which may be used in embodiments of the present invention. In the example shown in FIG. 9, the fiber can be considered to be guiding with low loss from roughly 1030 to 1070 nm. In this region, the dispersion is above 100 ps/nm/km as desired for the present invention.

EXAMPLE 1

Manufacture and Properties of Hollow Core and Solid Core PBG-Fibers

The following example describes possible PBG-fibers with anomalous dispersion for intra-cavity dispersion compensation and extra-cavity pulse compression of ultra-fast fiber lasers (e.g. Yb-doped). PBG-fibers are potentially very attractive for these purposes due to their high non-linear thresholds, high values of anomalous dispersion and low bending loss. Various aspects of the manufacture, properties and applications of PBG-fibers are e.g. discussed by Knight et al. in "Photonic Band Gap Guidance in Optical Fibers", Science, Vol. 282, 20 Nov. 1998, pp. 1476-1478 and by Broeng et al. in "Waveguidance by the photonic bandgap effect in optical fibres", Journal of Optics A, Pure and Applied Optics, Vol. 1, 1999, pp. 477-482 and in the textbook of [Bjarklev et al.] (cf. e.g. chapter 4 on fabrication and chapter 6 on PBG-fibers).

Figure 10:
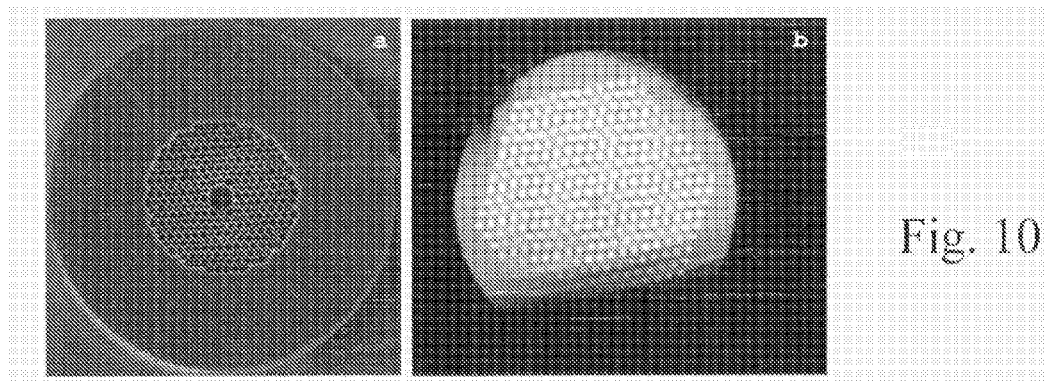
FIG. 10 shows microscope photographs of transversal cross-sections of (a) a hollow core photonic bandgab fiber (HC-PBGF), and (b) a solid core photonic bandgap fiber (SC-PBGF)

FIG. 10 shows microscope photographs of transversal cross-sections of (a) a hollow core photonic bandgab fiber (HC-PBGF), and (b) a solid core photonic bandgap fiber (SC-PBGF). Both fibers are based on a hexagonal arrangement of micro-structural features in disposed in the cladding surrounding the hollow and solid cores, respectively. Other arrangements than hexagonal (e.g. triangular or rectangular) are possible. The manufacture and properties of hollow core PBG-fibers are e.g. described in WO-99/64904, and of solid core PBG-fibers in WO-02/101429 and U.S. Pat. No. 6,404,966.

Figure 11:
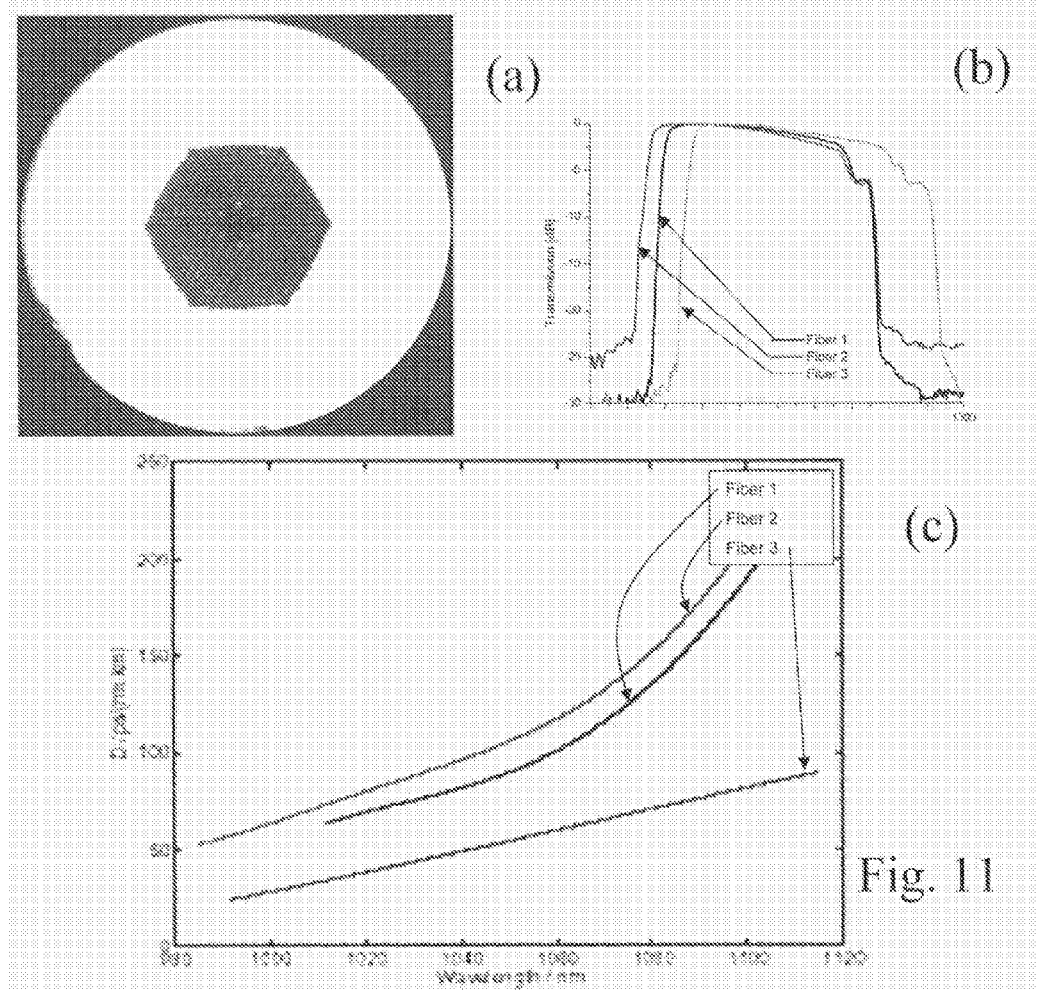
FIG. 11 shows (a) a microscope picture of a transversal cross-section, (b) transmission spectra, and (c) dispersion curves of 3 different hollow-core PBG-fibers (termed Fiber 1, Fiber 2, Fiber 3)

FIG. 11 shows (a) a microscope picture of a transversal cross-section of a HC-PBG-fiber, and (b) transmission spectra (between 0 and −30 dB in the wavelength range from 800 nm to 1300 nm (linear scale)), and (c) dispersion curves (between 0 and 250 ps/nm/km in the wavelength range from 980 nm to 1120 nm (both in linear scales)) of 3 different hollow-core PBG-fibers.

A HC-PBG fiber for the purpose of the present application is preferably relatively uniform in cross section over its length leading to fewer variations in dispersion along the fiber and hence to less bending of the dispersion curve and reduced higher order dispersion. It may further minimize mode-coupling to surface modes thus reducing undesired modal dispersion.

The three different fibers (termed Fiber 1, Fiber 2, Fiber 3 in FIGS. 11(*b*) and (*c*)) have a pitch (i.e. centre to centre distance) between the air-holes of the cladding of 3.0, 3.1 and 3.4 µm for fiber 1, 2 and 3 respectively. The different pitches result in fibers with slightly different bandgaps and significantly different dispersion slopes as shown in FIG. 11(*c*).

Figure 12:
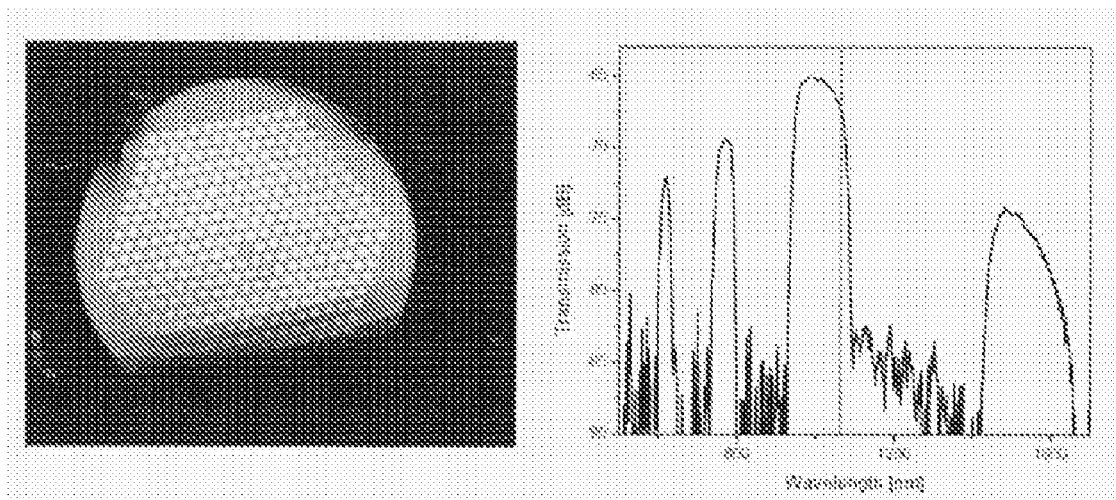
FIG. 12 shows (a) transversal cross-section and (b) transmission spectrum of a solid core PBG-fiber.

FIG. 12 shows (a) transversal cross-section and (b) transmission spectrum of a solid core PBG-fiber having 10 rings of doped (here Ge) micro-structural elements (pitch ~8 µm) around the core (MFD~9 µm). The fiber was designed for 1060 nm operation in the second bandgap (the bandgap centre being located at 983 nm). The transmission spectrum shows 4 well defined bandgaps in the range from 600 to 1600 nm.

Figure 13:
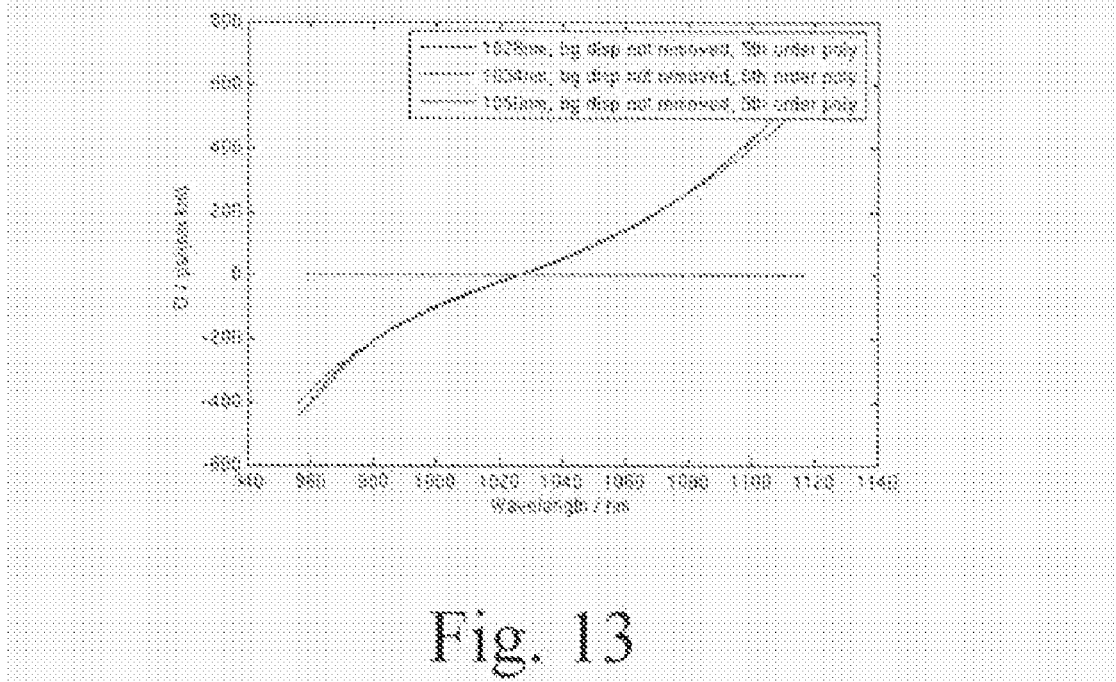
FIG. 13 shows the chromatic dispersion characteristic of a solid core PBG-fiber in the wavelength range from 960 to 1120 nm.

FIG. 13 shows the chromatic dispersion characteristics of 3 different solid core PBG-fibers (having pitch between ~8 µm and ~9 µm) in the wavelength range from 960 to 1120 nm. The dispersion ranges between approximately −400 ps/nm/km and +500 ps/nm/km (linear scale).

EXAMPLE 2

An Optical System without an Intra-Cavity PBG Fiber

To introduce possible components of a system according to the invention, a mode-locked fiber laser without any intra-cavity PBG fiber is first described.

Figure 14:
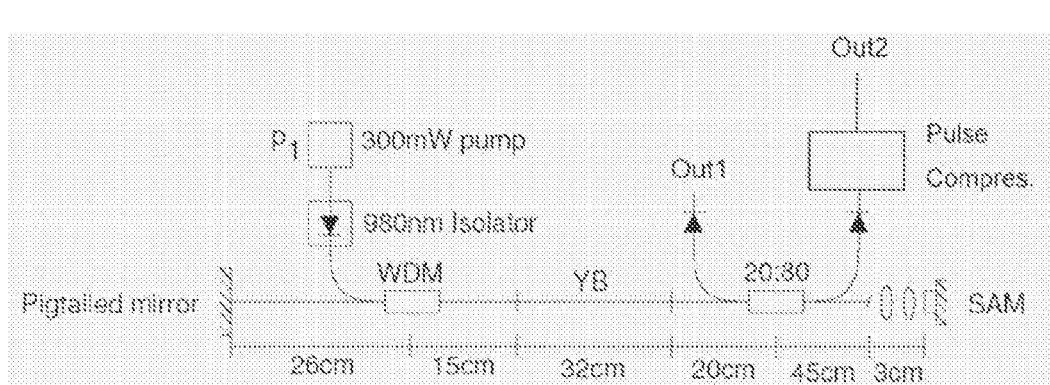
FIG. 14 shows a block diagram of a mode-locked laser comprising a basic arrangement of a laser cavity without any sections of PBG-fiber but optionally comprising an extra-cavity PBG-fiber for pulse compression.

FIG. 14 shows a diagram of the laser configuration. The cavity of the oscillator (spatially limited by the two reflecting elements termed 'Pigtailed mirror' and 'SAM', respectively, in FIG. 14) consists of a polarization maintaining (PM) wave division multiplexer ('WDM' in FIG. 14), 32 cm of highly doped ytterbium PM fiber (300 dB/m absorption at 976 μm, termed 'YB' in FIG. 14), and a PM 20:80 coupler (termed '20:80' in FIG. 14) with PM fiber pigtails (output coupling: 20%). The coupler also works as a polarizer, transmitting only the light in the slow axis, and hence ensures that the output from the cavity is linearly polarized. The primary output of the cavity is labeled "Out 1" in FIG. 14. The total length of fibers in the cavity is 1.40 m, and the repetition rate of the laser is 71 MHz. A secondary output of the laser cavity is connected to a dispersive pulse-compressor ('Pulse Compres.' in FIG. 14), which e.g. could be a grating pair or a PBG-fiber. The output of the pulse compressor is labeled 'Out 2' in FIG. 14. The PM- and non-PM fiber lengths may e.g. be 'Panda 980' and 'HI 1060', respectively, from Corning Inc.

A saturable absorber mirror (termed 'SAM' in FIG. 14) with a high modulation depth of 24%, saturation fluence of ~70 μJ/cm$^2$, non-saturable losses of 16% and a recovery time of <10 ps was used to mode-lock the laser. Two 11 mm aspheric lenses (Thorlabs C220-B) were used in front of the SAM (e.g. a SAM-1040-40-x from BATOP GmbH, Weimar, Germany), and the fiber end was angle cleaved in order to avoid back reflections.

A 300 mW fiber-pigtailed 976 nm laser diode (termed '300 mW pump' in FIG. 14, e.g. a FOL0906A30-D17-976 from Fitel (Furukawa Electric Europe, Ltd., London, UK) was used to pump the oscillator. A fiber-pigtailed 976 nm isolator (termed '980 nm Isolator' in FIG. 14, e.g. a 980 nm polarization independent isolator, e.g. H11060, no connector, Part number OIST-11911233, Agiltron Inc., Woburn, Mass., USA) was used to protect the pump diode.

Figure 15:
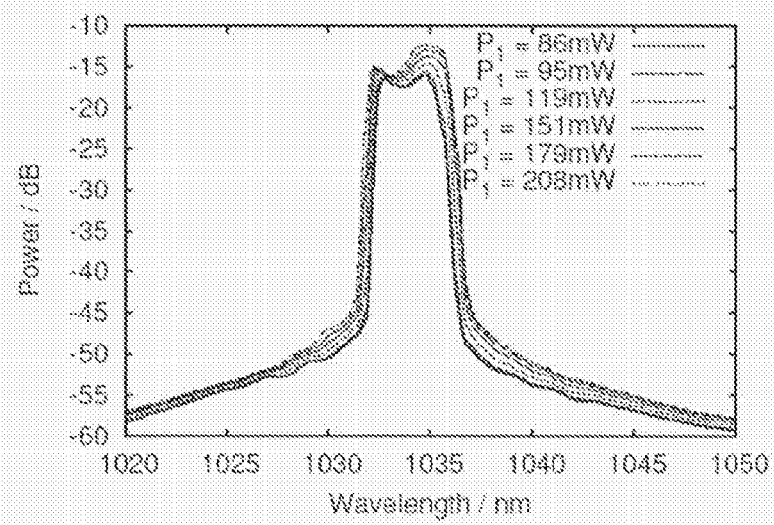
FIG. 15 shows the output spectrum vs. pump power of the laser configuration of FIG. 14.

FIG. 15 shows the output spectrum from the laser ('Out 1' in FIG. 14) vs. pump power.

Figure 16:
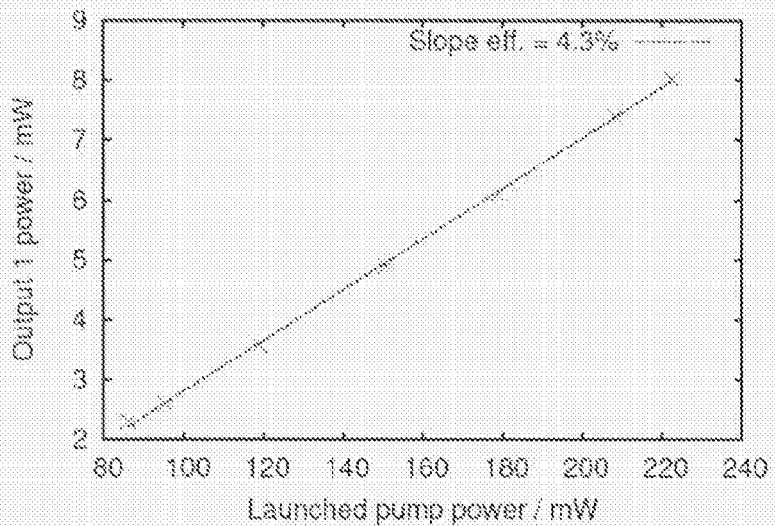
FIG. 16 shows the output power vs. pump power of the laser configuration of FIG. 14, indicating slope efficiency.

FIG. 16 shows the output power ('Out 1' in FIG. 14) vs. pump power.

The output pulses of the laser are highly chirped, as there is no intra cavity dispersion compensation in the cavity in the configuration of FIG. 14.

Figure 17:
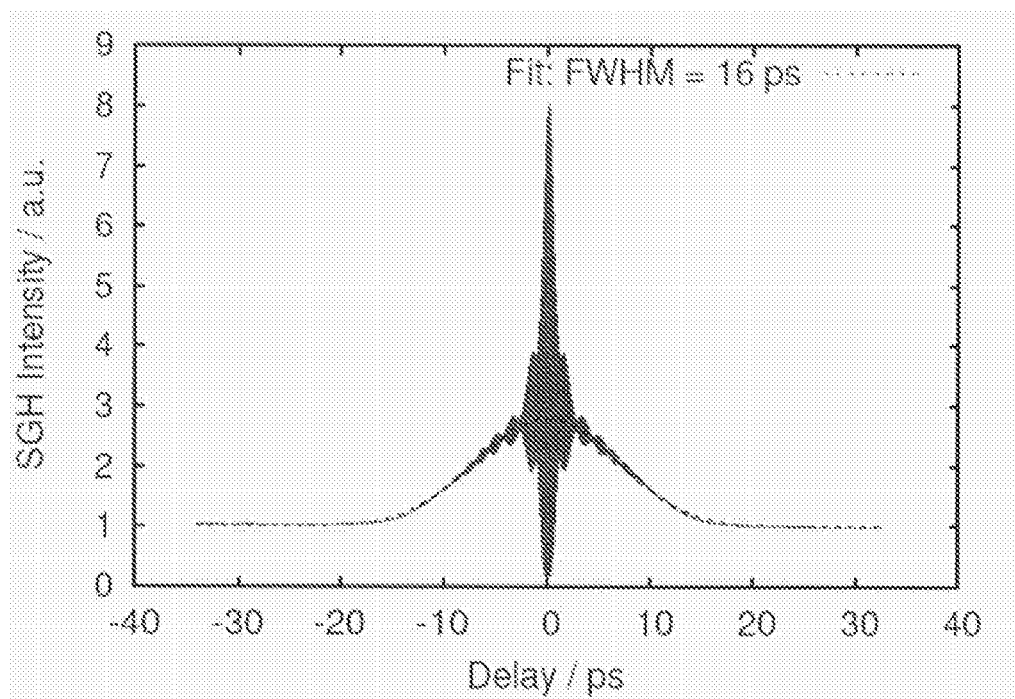
FIG. 17 shows the uncompressed pulse autocorrelation trace of the laser configuration of FIG. 14.

FIG. 17 shows the measured autocorrelation trace of the uncompressed output pulse measured at "Out1" of FIG. 14. The pulse has an autocorrelation FWHM of 16 ps, corresponding to a pulse duration of 11 ps. The output pulses of the laser are highly chirped, as seen from the clear pedestal on the autocorrelation trace. This chirp is caused by the lack of intra-cavity dispersion compensation in the laser configuration of FIG. 14.

Figure 18:
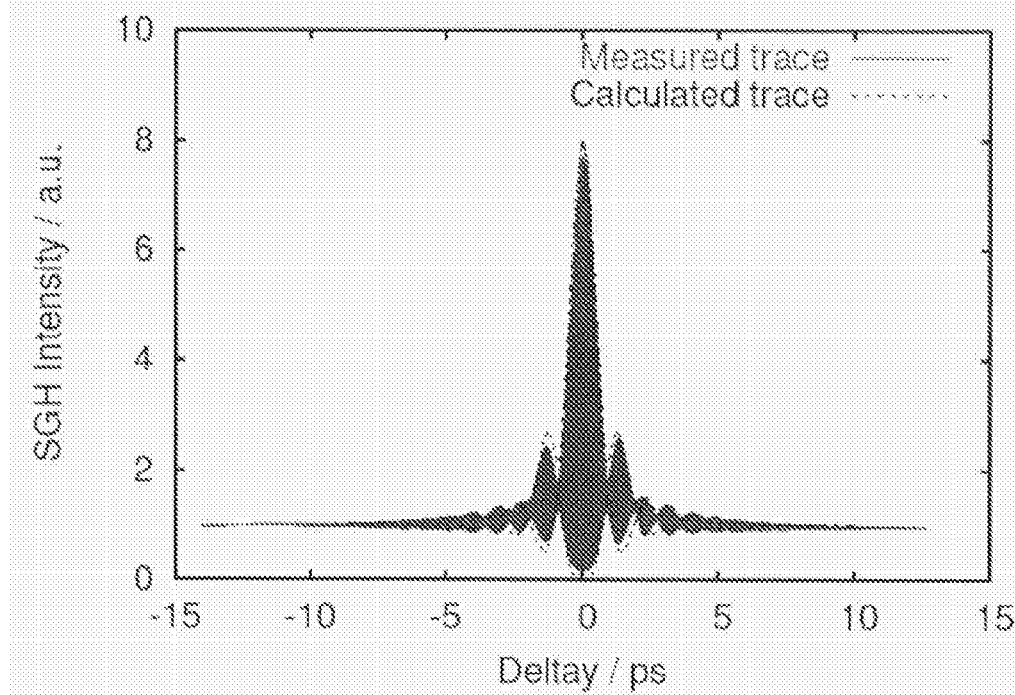
FIG. 18 shows the compressed pulse autocorrelation trace (measured and calculated) of the laser configuration of FIG. 14.

In FIG. 18 the measured autocorrelation trace of the compressed output pulses ('Out2' in FIG. 14) is shown. The compressed pulses were obtained with a grating separation of 15 cm, corresponding to a total GVD of −1.97 ps$^2$. The measured autocorrelation trace is compared to a calculated autocorrelation trace (dashed line). The calculated autocorrelation trace is calculated by Fourier transforming the measured spectrum. A small amount of higher order chirp is added to give the best fit to the the autocorrelation trace. The measured autocorrelation trace can be seen to be in good agreement with the calculated autocorrelation trace, and hence the autocorrelation trace is de-convoluted to a pulse duration of 800 fs. A PBG fiber can also be used for this pulse compression. In this case a length of 41.3 m HC-PBG fiber (fiber 2 of FIG. 11) is needed to obtain the pulse compression shown in FIG. 18.

It should be mentioned that the amount of dispersion needed for pulse compression (e.g. the length of HC-PBG fiber needed) may be reduced by introducing some sort of intra-cavity dispersion compensation (as discussed in Examples 3 and 4), because thereby the bandwidth of the pulses is increased.

A HC-PBG fiber can in principle be used to compress pulses from any laser system where the output pulse is pre-chirped with a positive chirp (i.e. it can replace grating- or prism-based compressors).

Figure 19:
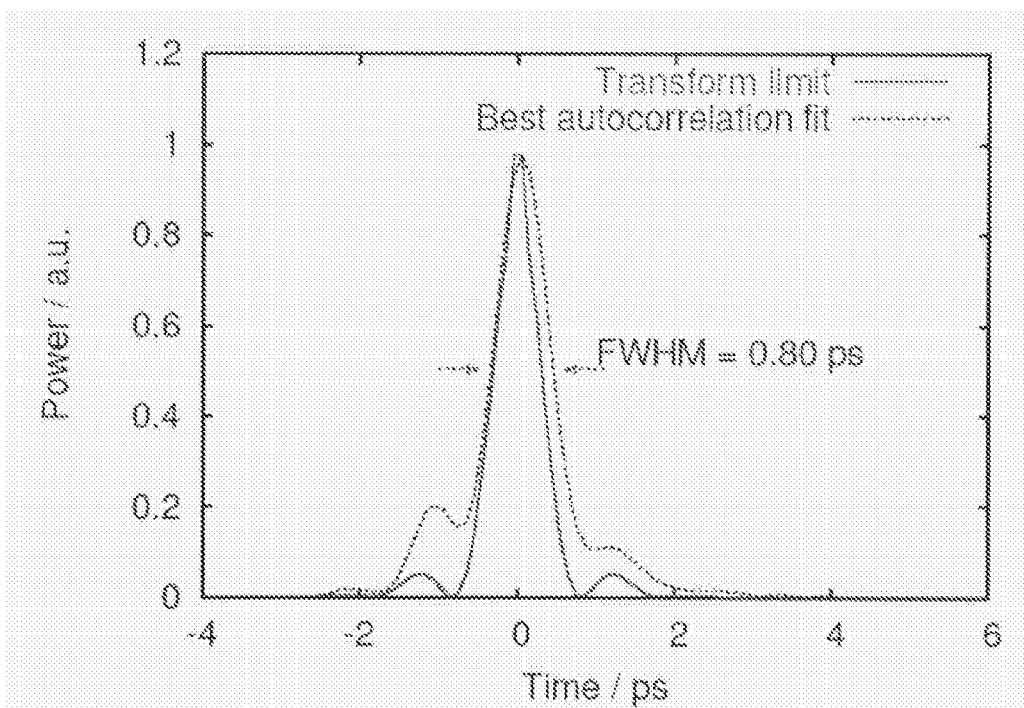
FIG. 19 shows temporal pulse shape of a transform limited pulse (calculated by Fourier transforming the measured spectra with zero phase, solid line), and of the pulse giving the best autocorrelation fit (dotted line) of the laser configuration of FIG. 14.

FIG. 19 shows temporal pulse shape of a transform limited pulse (calculated by Fourier transforming the measured spectra with zero phase, solid line), and of the pulse giving the best autocorrelation fit (dotted line) of the laser configuration of FIG. 14. The output pulse is slightly longer than the transform limit.

Figure 20:
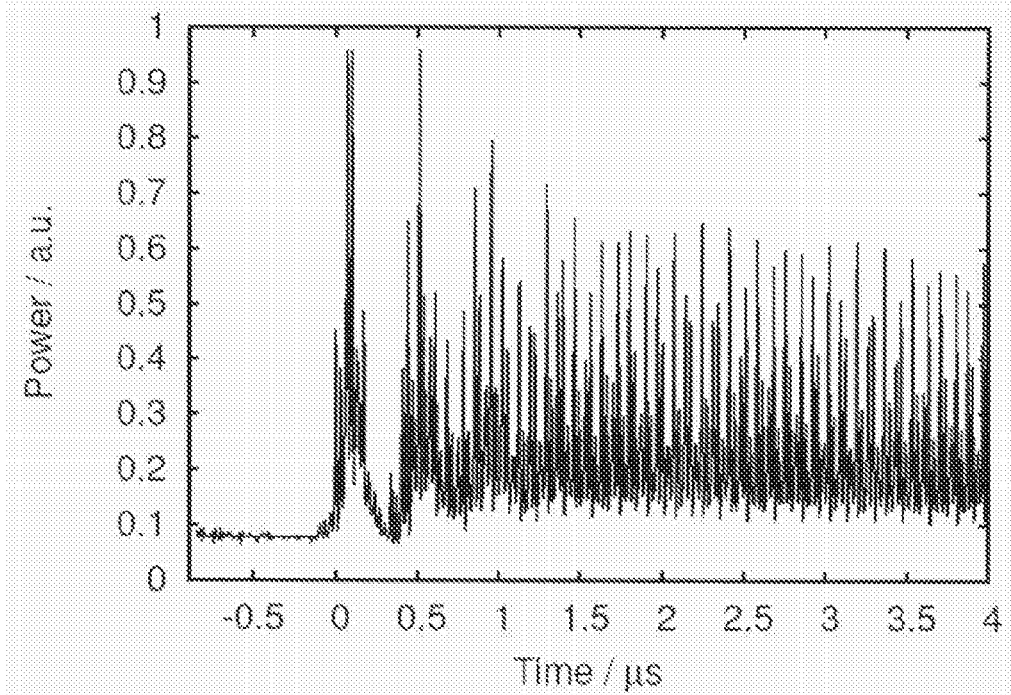
FIG. 20 shows a typical startup of the laser configuration of FIG. 14 with a transition from Q-switched mode-locking to CW mode-locking.

The stability of the SAM was tested by turning the laser off and on again. 300 turn-off-on experiments were carried out, and no changes were observed in the spectrum or output power. In FIG. 20 a typical startup phase of the laser configuration of FIG. 14 with a transition from Q-switched mode-locking to CW mode-locking is shown.

EXAMPLE 3

An Optical System with an Intra-Cavity Solid Core PBG Fiber

Figure 21:
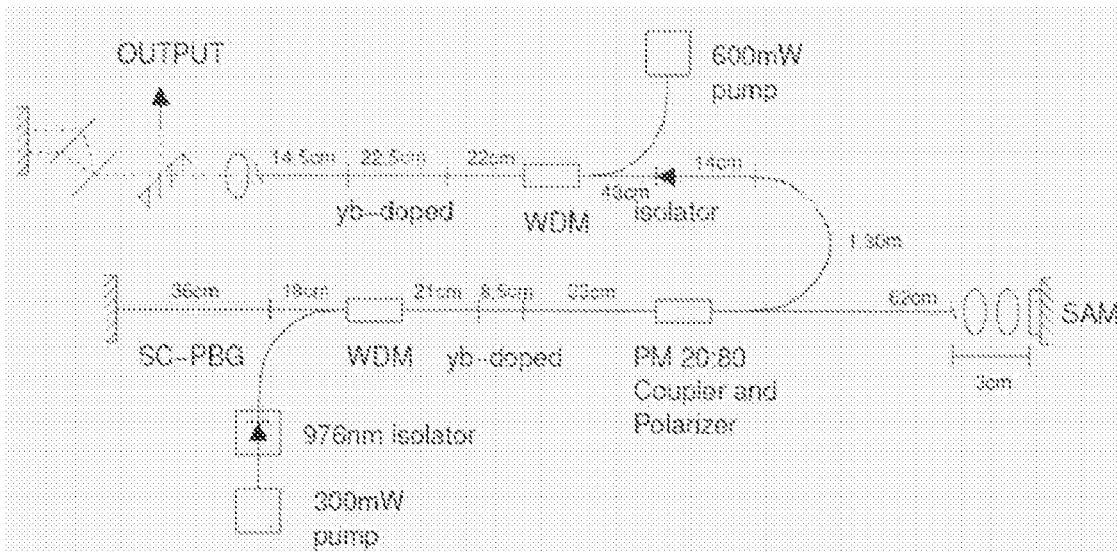
FIG. 21 shows a block diagram of an all-fiber laser system acording to the invention comprising a solid core PBG-fiber in the laser cavity.

FIG. 21 shows a block diagram of an all-fiber laser system according to the invention comprising a solid core PBG-fiber (SC-PBG) in the laser cavity.

The cavity consists of a WDM, 8.5 cm of highly doped ytterbium fiber (1200 dB/m absorption at 976 nm), and a PM 20:80 coupler with PM fiber pigtails (output coupling: 20%), and the 0.36 m of SC-PBG fiber for intra-cavity dispersion compensation. The coupler also works as a polarizer, transmitting only the light in the slow axis, and hence ensures that the output from the cavity i linear polarized. The total length of PM fibers in the cavity was 0.95 m, and the total length of non-PM fibers in the cavity were 0.835 m (including the SC-PBG fiber). The non-PM fibers of the cavity were all kept straight in order to avoid polarization rotation.

The SC-PBG fiber was spliced to a standard fiber using a standard Ericsson Fusion splicer using an optimized splicing method.

A saturable absorber mirror (SAM) with a modulation depth of 24%, saturation fluence of ~70 μJ/cm, non-saturable losses of 16% and a recovery time of <10 ps was used to mode-lock the laser. Two lenses with focal lengths of 11 mm and 6.24 mm (Thorlabs C220 and C610) were used to focus onto the SAM, and the fiber end was angle cleaved in order to avoid back reflections.

The fiber and the two lenses were mounted in a lens tube, enabling a very compact setup. A 300 mW fiber-pigtailed 976 nm laser diode (e.g. a LC94L74-20A, 300 mW from Bookham, Paignton, UK) was used to pump the oscillator. A fiber-pigtailed 976 nm isolator was used to protect the pump diode.

A relatively large net GVD ~0.004 ps$^2$, was chosen in order to reduce the significance of the large total third order dispersion (TOD) ~0.0013 ps$^3$ on the pulse shaping. As a result of the large net GVD, the output pulses from the oscillator were pre-stretched with a positive chirp.

The extra-cavity amplifier consisted of an isolator, a WDM, 22.5 cm highly doped ytterbium fiber (1200 dB/m absorption at 976 μm), and a FC-APC, angle cleaved fiber connector. A 600 mW single mode fiber-pigtailed 974 nm diode laser (e.g. LC96V74-20A 580 mW from Bookham) was used to pump the amplifier. The total length of non-PM fibers in the amplifier was 1.16 m, and the length of PM fiber was 1.3 m. The amplifier was spliced directly onto the laser, and again all non-PM sections were kept straight in order to avoid polarization evolution. In this way it was possible to maintain a linearly polarized output from the amplifier. The length of standard fiber after the ytterbium fiber in the amplifier was 14.5 cm.

Two 1250 lines/mm transmission gratings were used for extra-cavity pulse compression. The gratings were set up in Lithrow angle (40°), and the transmission was measured to 70%.

Figure 22:
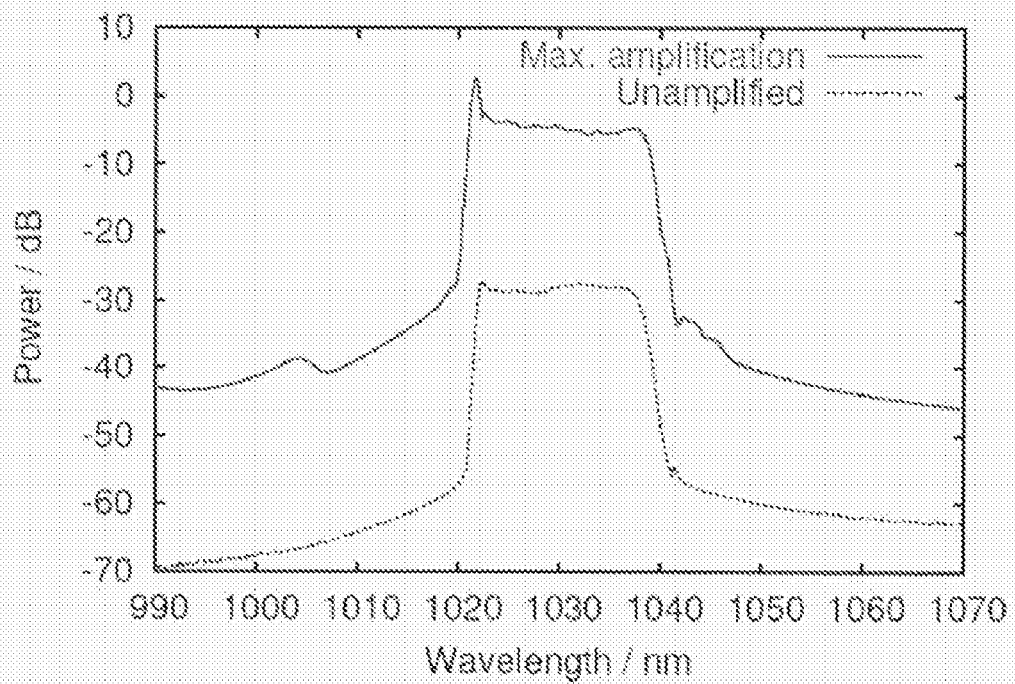
FIG. 22 shows a spectrum of the output pulse at maximum amplification and zero amplification of the laser system of FIG. 21 (both spectra were measured directly after the laser and amplifier, respectively.

FIG. 22 shows a spectrum of the output pulse at maximum amplification and zero amplification of the laser system of FIG. 21 (both spectra were measured directly after the laser and amplifier, respectively). The spectrum resembles that of a stretched pulse mode-locked laser in the positive net GVD regime, and the spectral modulations is often observed in lasers comprising a non-linear element with finite recovery time. The central wavelength of the laser was 1030 nm, and the spectral 10 dB width was 17.5 nm.

Figure 23:
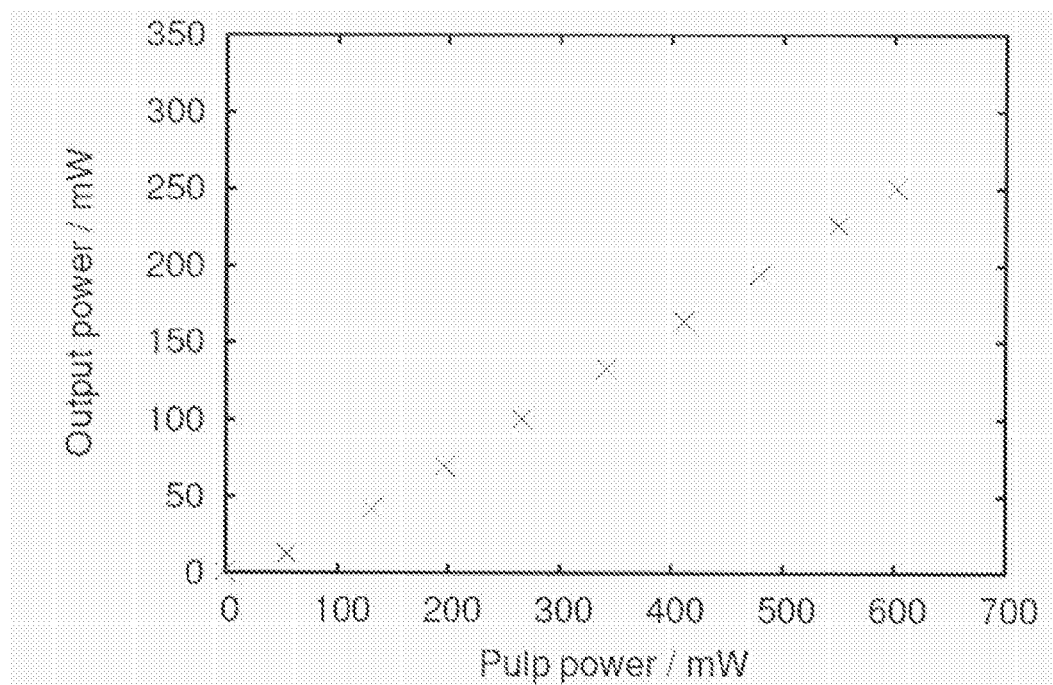
FIG. 23 shows output power after the compressor vs. pump power of the amplifier of the laser system of FIG. 21.

FIG. 23 shows output power after the compressor vs. pump power of the amplifier of the laser system of FIG. 21. At the highest pump power the output pulses energy was 4.5 nJ. The grating distance was 11.6 mm, corresponding to a total GVD of 0.157 ps$^2$.

Figure 24:
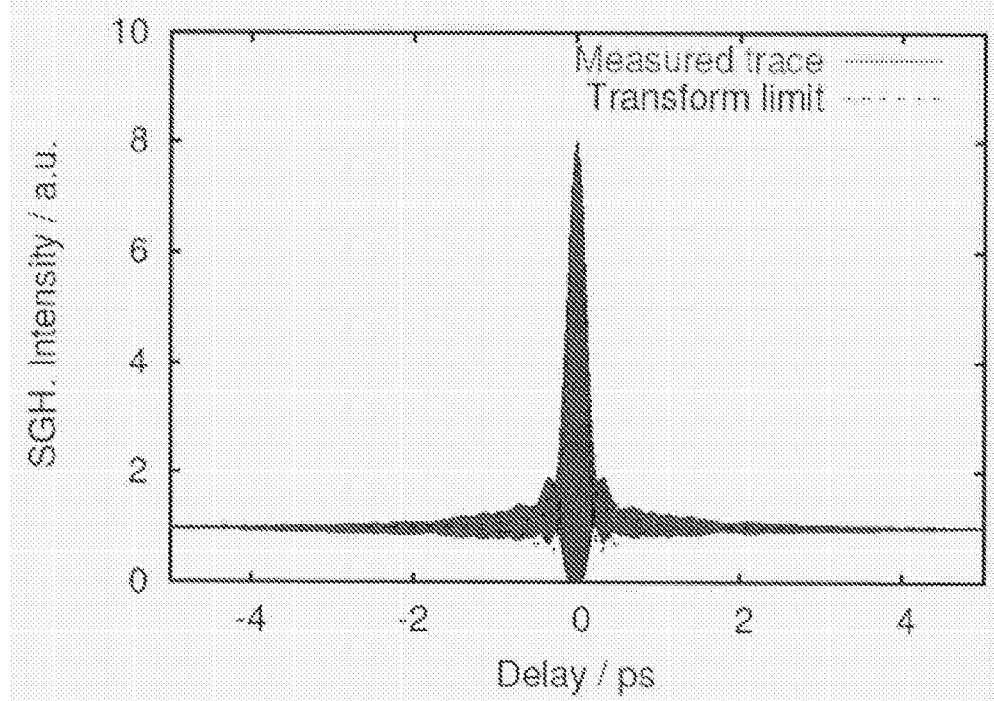
FIG. 24 shows an experimental autocorrelation trace at maximum amplification for the laser system of FIG. 21 (the autocorrelation trace is compared to the auto-correlation trace of the transform limited pulse (dashed line))

FIG. 24 shows an experimental autocorrelation trace at maximum amplification for the laser system of FIG. 21. The autocorrelation trace is compared to the auto-correlation trace of the transform limited pulse (dashed line). The autocorrelation trace is slightly larger than the autocorrelation trace calculated from the transform limited pulse which was obtained by numerically Fourier transforming the measured spectrum with zero phase. The measured autocorrelation trace corresponds to a pulse duration of 186 fs, and is slightly larger than the transform limited pulse duration of 156 fs.

EXAMPLE 4

Figure 25:
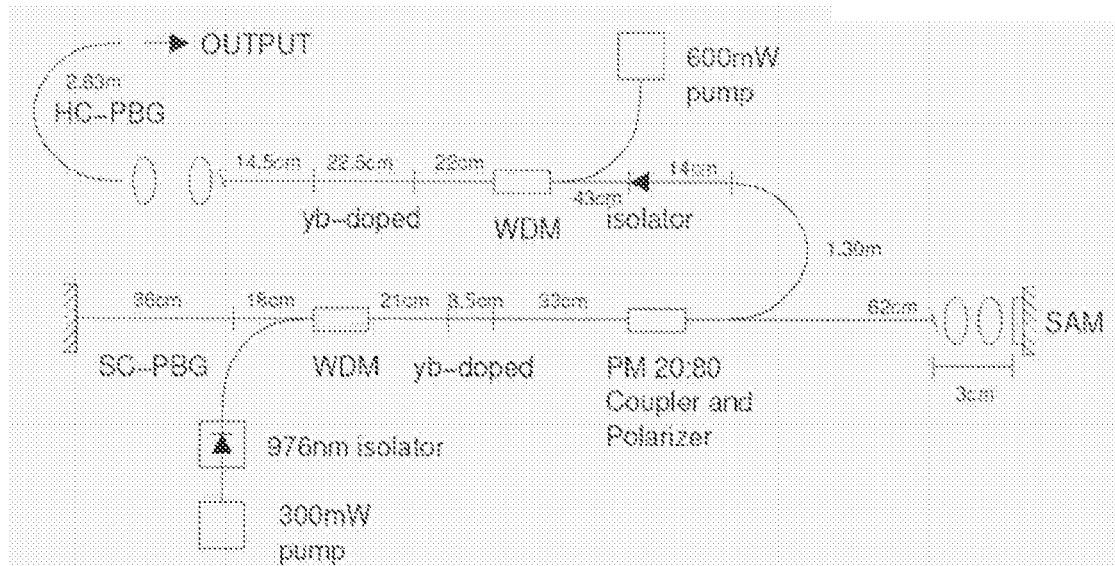
FIG. 25 shows a block diagram of an all-fiber laser system acording to the invention comprising a solid core PBG-fiber in the laser cavity and a hollow core PBG-fiber external to the laser cavity.

An Optical System with an Intra-Cavity Solid Core PBG Fiber and an Extra-Cavity Hollow Core PBG-Fiber FIG. 25 shows a block diagram of an all-fiber laser system according to the invention comprising an intra-cavity solid core PBG-fiber (SC-PBG) for dispersion compensation and an extra-cavity hollow core PBG-fiber (HC-PBG) for pulse compression. The setup of the embodiment of FIG. 25 is identical to the one described in Example 3, except that a pulse compressor (here in the form of a HC-PBG-fiber) is added to the output of the amplifier (i.e. the hollow core PBG-fiber is optically coupled to the output of the amplifier, here end-coupled to the length of standard fiber following the Yb-doped fiber).

The extra-cavity compressor consists of a single length of HC-PBG fiber. The transmission through the HC-PBG fiber was measured to be 82.2%, and was obtained with two aspheric lenses (e.g. an 8 mm lens after the amplifier and an 11 mm lens before the HC-PBG (e.g. Thorlabs 240 and 230)). However if an additional isolator is inserted after the amplifier, the HC-PBG fiber can also be spliced to the standard fiber with low loss. Without this isolator, it is advantageous to angle cleave the standard fiber to suppress back reflections into the amplifier. The HC-PBG fiber was mounted in a way enabling rotation around its own longitudinal axes, in order to only couple light into one of its birefringent axes.

The repetition rate of the laser was 55.3 MHz, and stable CW mode-locking was obtained at a pump power of 145 mW. The pulse stability was observed with an RF-spectrum analyzer, and the peaks of the side-bands were more than 72 dB lower than the fundamental peak. This corresponds to a relative amplitude fluctuation of less than $1 \cdot 10^{-3}$.

Figure 26:
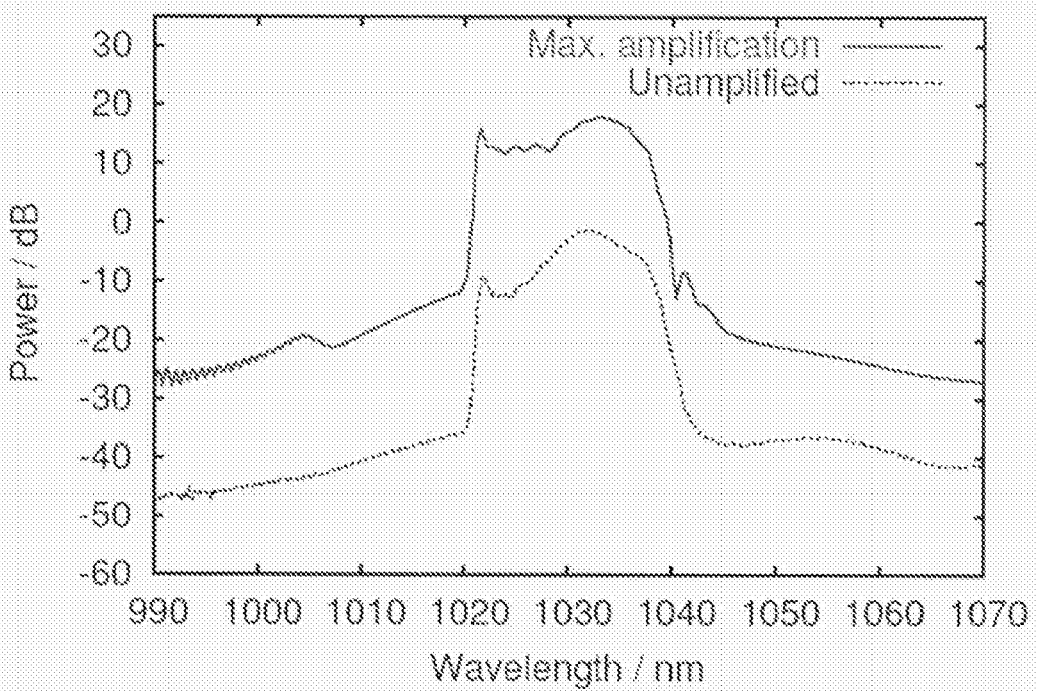
FIG. 26 shows a spectrum of the output pulse at maximum amplification and zero amplification of the laser system of FIG. 25 (both spectra were measured directly after the hollow core PBG-fiber).

FIG. 26 shows a spectrum of the output pulse at maximum amplification and zero amplification of the laser system of FIG. 25 (both spectra were measured directly after the hollow core PBG-fiber). The spectrum resembles that of a stretched pulse mode-locked laser in the positive net GVD regime, and the spectral modulations is often observed in lasers comprising a non-linear element with finite recovery time. The central wavelength of the laser was 1030 nm, and the spectral 10 dB width was 17.4 nm.

Figure 27:
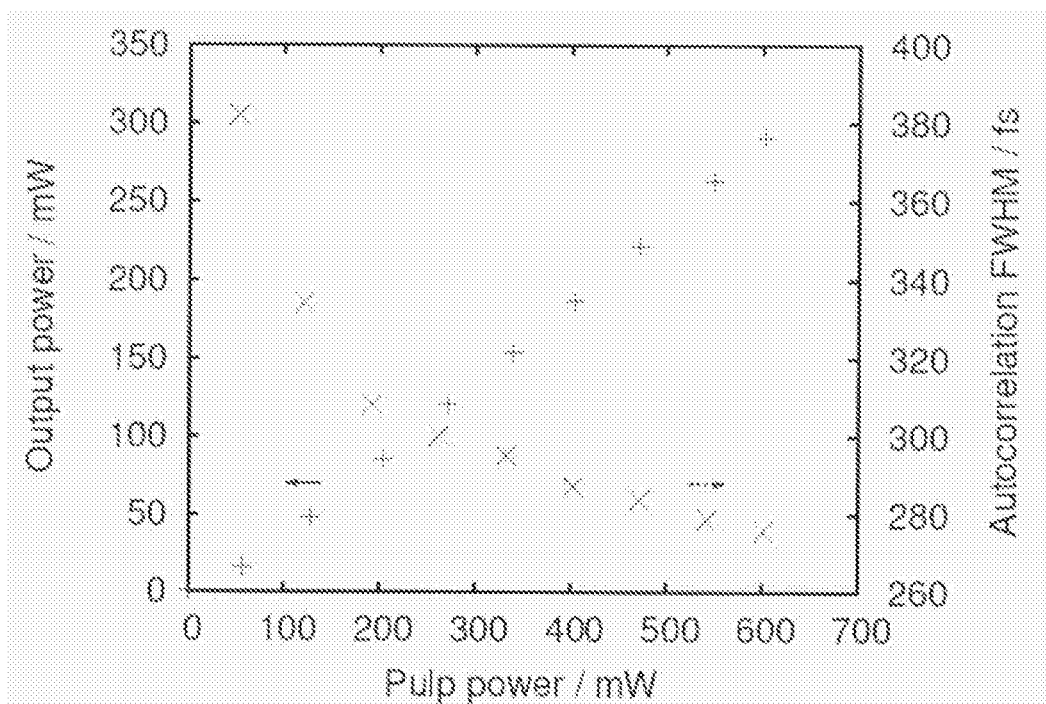
FIG. 27 shows output power (+) and output autocorrelation FWHM of the top envelope (x) of the laser system of FIG. 25.

FIG. 27 shows output power (+) and output autocorrelation FWHM of the top envelope (x) of the laser system of FIG. 25 vs. pump power. At the highest pump power the output pulse energy was 5.3 nJ. The length of the HC-PBG fiber was optimized to give shortest possible pulses at maximum amplification, with a cut-back experiment. Shortest possible pulses were obtained with 2.63 m of HC-PBG fiber.

Figure 28:
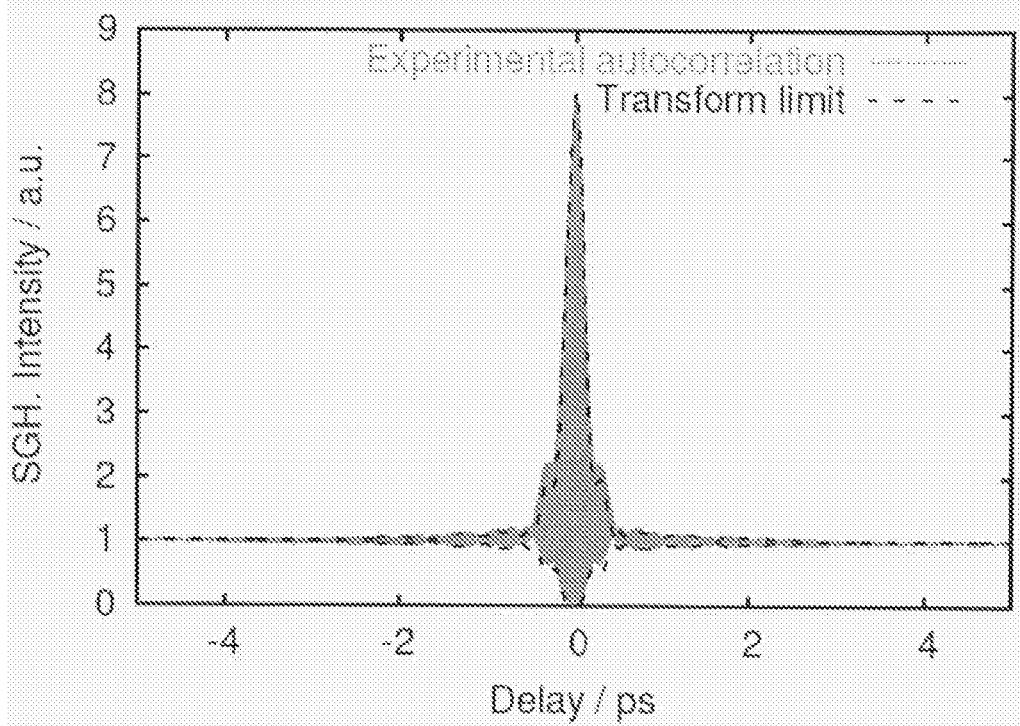
FIG. 28 shows experimental autocorrelation trace at maximum amplification; the auto-correlation trace is compared to the autocorrelation trace of the transform limited pulse (dashed).

FIG. 28 shows experimental an autocorrelation trace at maximum amplification. The auto-correlation trace is compared to the autocorrelation trace of the transform limited pulse (dashed curve). The autocorrelation trace is almost identical to the autocorrelation trace calculated from the transform limited pulse, which was obtained by numerically Fourier transforming the measured spectrum with zero phase. The transform limited pulse has a pulse duration of 158 fs, and hence the experimental autocorrelation trace is de-convoluted to a pulse duration of 158 fs (FWHM).

The autocorrelation FWHM vs. pump power is shown in FIG. 27. This decrease in pulse duration with increasing pump power is a consequence of nonlinear pulse propagation in the extra-cavity amplifier. Spectral broadening is observed as a result of self-phase-modulation (SPM), but whereas SPM usually induces an incompressible nonlinear chirp on the pulse, pulses pre-chirped with a large third order chirp have previously been demonstrated to have an optimal pulse duration at a certain amount of SPM. Hence SPM can also be used to compensate for third order chirp in a pulse. The third order chirp of the pulse is a consequence of the large uncompensated TOD of the cavity.

FIG. 29a shows a pulsed laser and a chirped pulse fiber amplifier. The chirp element 1000 provides negative dispersion. This is followed by an actively doped large mode area fiber 602, to provide gain and a compressor element 1001 with positive dispersion and large non-linear thresholds.

The chirp element 1000 in the chirped pulse amplifier of FIG. 29a may for example be provided by a pair of diffraction gratings 1002, as shown in FIG. 29b, a standard optical fiber 601, as shown in FIG. 29c, a fiber Bragg grating 703, as shown in FIG. 29d, or a PBG fiber 603, as shown in FIG. 29e.

The compressor element 1001 in the chirped pulse amplifier of FIG. 29a can be provided by the same type of components as the negative dispersion. As opposed to the chirp element it is important that non-linear threshold is high in the compressor element. Furthermore the fibers can only be used at wavelengths were they have positive dispersion. Accordingly standard fibers can not be used below their zero-dispersion wavelength, which typically is around 1.3 μm or 1.55 μm.

The invention claimed is:

1. A short pulse optical system for generating short laser-pulses, said optical system being in the form of a modelocked laser, and comprising; an optical pump; and a laser cavity, comprising; an intracavity modulator; an intracavity dispersion compensating photonic bandgap (PBG) fiber, comprising a solid core that is substantially homogeneous and an all solid cladding, wherein the solid core has a refractive index that is lower than a refractive index of the cladding; a polarizing component adapted to provide the cavity with a single polarization; and an active medium optically coupled to said PBG fiber and said optical pump, wherein said PBG fiber is connected to said laser cavity via at least one splice; wherein any non-polarization maintaining fibers in the laser cavity are kept substantially straight.

2. A short pulse optical system according to claim 1, wherein said optical pump is a laser diode.

3. A short pulse optical system according to claim 1, wherein the intra cavity modulator is selected from the group consisting of an acousto-optic modulator, a LiNbO3 crystal, a semiconductor modulator, a saturable absorber, an APM, or coupled cavity modulators.

4. A short pulse optical system according to claim 1, wherein the intra cavity modulator is a semiconductor saturable absorber mirror (SESAM) modulator.

5. A short pulse optical system according to claim 1 wherein the active medium is a waveguide or an actively doped semiconductor wafer.

6. A short pulse optical system according to claim 5 wherein the active medium is a doped fiber.

7. A short pulse optical system according to claim 6 wherein the active medium is a Large Mode Area actively doped photonic crystal fiber.

8. A short pulse optical system according to claim 7 wherein the laser cavity further comprises a semiconductor saturable absorber mirror (SESAM).

9. A short pulse optical system according to claim 1, wherein the intracavity dispersion compensating PBG fiber and the active medium are coupled to each other with one or more intermediate light transmitting elements.

10. A short pulse optical system according to claim 7, wherein the large mode area actively doped photonic crystal fiber is spliced to an index guiding and mode expanded fiber to provide a low loss combination of the two fibers.

11. A short pulse optical system according to claim 10 wherein the index guiding and mode expanded fiber is a standard fiber or a PCF.

12. A short pulse optical system according to claim 1 further comprising extra-cavity light transmission element(s) coupled to the laser cavity to receive an output beam therefrom.

13. A short pulse optical system according to claim 12 wherein the extra-cavity light transmission element(s) comprises one or more extra-cavity fibers.

14. A short pulse optical system according to claim 12 wherein the extra-cavity light transmission element(s) comprises elements for chirped pulse amplification, said elements comprising one or more elements for chromatically dispersing the optical pulses, one or more elements for amplifying the temporally broadened pulses, and one or more elements for recompressing.

15. A short pulse optical system according to claim 14 wherein the one or more extra-cavity elements for recompressing is a PBG fiber.

16. A short pulse optical system according to claim 15 wherein said PBG fiber for recompressing is a hollow core PBG fiber.

17. A short pulse optical system according to claim 14 wherein the extra-cavity element for amplifying the temporally broadened pulses is a Large Mode Area actively doped photonic crystal fiber.

18. A short pulse optical system according to claim 13, wherein the extra-cavity comprises a PBG fiber.

19. A short pulse optical system according to claim 18, wherein the PBG fiber of the extra-cavity is a hollow core PBG fiber.

20. A short pulse optical system according to claim 1, wherein the intra cavity modulator is an active modulator.

21. A short pulse optical system according to claim 1, wherein the intra cavity modulator is a passive modulator.

22. A short pulse optical system according to claim 8, wherein said active medium has a high non-linear thresholds.

23. A short pulse optical system according to claim 14, wherein said one or more elements for chromatically dispersing the optical pulses is selected from a pair of diffraction gratings, an optical fiber, or a fiber Bragg grating.

24. A short pulse optical system according to claim 6, wherein the doped fiber is a Nd-, Yb—Er-, Pr- or a Tm-doped fiber.

25. A short pulse optical system according to claim 1, wherein said solid core PBG fiber is coupled within the cavity via at least one splice to a fiber having a cladding without microstructures.

26. A short pulse optical system according to claim 12, wherein the extra-cavity light transmission element(s) comprises elements for amplification and pulse compression.

27. A short pulse optical system according to claim 26, wherein pulse compression is performed in a PBG fiber.

28. A short pulse optical system according to claim 1, wherein said laser-pulses are in the range from 10 picoseconds ($10*10^{-12}$ s) to femtoseconds ($10^{15}$ s).

* * * * *

UNITED STATES PATENT AND TRADEMARK OFFICE
CERTIFICATE OF CORRECTION

| | | |
|---|---|---|
| PATENT NO. | : 7,813,387 B2 | Page 1 of 1 |
| APPLICATION NO. | : 11/277252 | |
| DATED | : October 12, 2010 | |
| INVENTOR(S) | : Claus Friis Pedersen et al. | |

It is certified that error appears in the above-identified patent and that said Letters Patent is hereby corrected as shown below:

Column 21:
Claim 1, line 12, change "to" to --in--

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,813,387 B2 | Page 1 of 1 |
| APPLICATION NO. | : 11/277252 | |
| DATED | : October 12, 2010 | |
| INVENTOR(S) | : Claus Friis Pedersen et al. | |

It is certified that error appears in the above-identified patent and that said Letters Patent is hereby corrected as shown below:

Column 2, line 22
(Claim 1, line 12) change "to" to --in--

This certificate supersedes the Certificate of Correction issued April 12, 2011.

Signed and Sealed this
Tenth Day of May, 2011

David J. Kappos
*Director of the United States Patent and Trademark Office*